United States Patent [19]

Ito et al.

[11] Patent Number: 5,053,870

[45] Date of Patent: Oct. 1, 1991

[54] GHOST CANCELLING DEVICE USING VARIABLE AMPLIFIER CONTROLLED BY CRITERION FUNCTION

[75] Inventors: Shigehiro Ito, Toride; Yuji Nishi; Tatsushi Kouguchi, both of Iwai; Kazuyuki Ebihara, Toride, all of Japan

[73] Assignee: Victor Company of Japan, Ltd., Japan

[21] Appl. No.: 426,602

[22] Filed: Oct. 25, 1989

[30] Foreign Application Priority Data

Oct. 26, 1988 [JP] Japan .................................. 63-270042

[51] Int. Cl.$^5$ .............................................. H04N 5/21
[52] U.S. Cl. ........................................ 358/167; 358/905
[58] Field of Search ............. 358/166, 167, 905, 21 V

[56] References Cited

U.S. PATENT DOCUMENTS 4,413,282 11/1983 Wargo .................................. 358/167

FOREIGN PATENT DOCUMENTS 63-18813 1/1988 Japan .

OTHER PUBLICATIONS

"Hybrid Ghost Canceller" by Murakami et al; Technical Report of Society of Television Engineers; RE 80-6; Feb. 21, 1980.
"TV-Ghost Cancel Adapter" by Obara et al; Technical Report of Society of Television Engineers; IT52-1; Feb. 26, 1982.
"A Study of Reference Signal for Transversal-Type Ghost Canceller" by Obara; NHK Science and Technical Research Laboratories, Tokyo, 157 Japan pp. 1381-1389.

Primary Examiner—James J. Groody
Assistant Examiner—Mark R. Powell
Attorney, Agent, or Firm—Lowe, Price, Leblanc & Becker

[57] ABSTRACT

Ghosts from an input video signal are substantially eliminated by supplying to the signal a filter for deriving an output video signal. A weight setting circuit controls the filter frequency response. A control signal for the weight setting circuit sets the filter frequency response to substantially eliminate the ghosts. The control signal is derived by responding to one of the video signals to derive a first digital signal that extracts a pulse-like signal having a predetermined time period from the video signal. The position in the time axis of a peak of the first signal is detected to generate a signal having a reference waveform at the time corresponding to the detected position in the peak time-base. A second signal having a value representing the magnitude of the relative values of the first signal and reference waveform is derived. A third signal representing a criterion function for the presence of a ghost in the input video signal is derived in response to a unipolarity function of the average value of the value of the second signal. The second and third signals control the value of the control signal for the weight setting circuit.

11 Claims, 15 Drawing Sheets

FIG. 5(A)
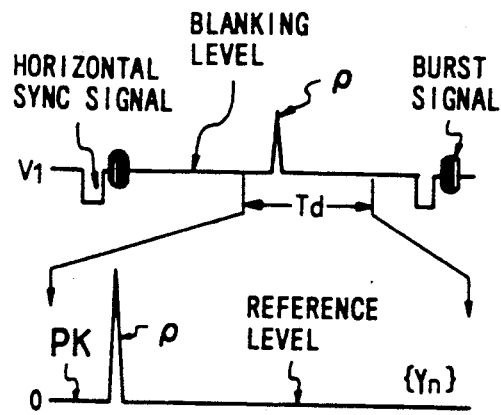
FIG. 5(B)
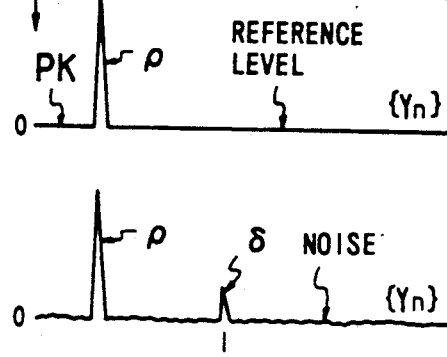
FIG. 5(C)
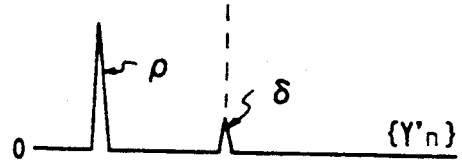
FIG. 5(D)
FIG. 5(E)
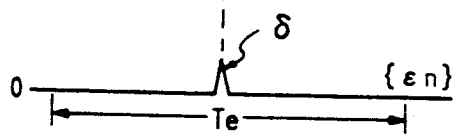
FIG. 5(F)
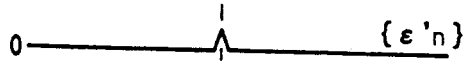
FIG. 5(G)
FIG. 5(H)
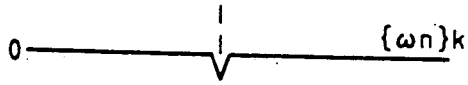
FIG. 5(I)
FIG. 5(J)
FIG. 5(K)
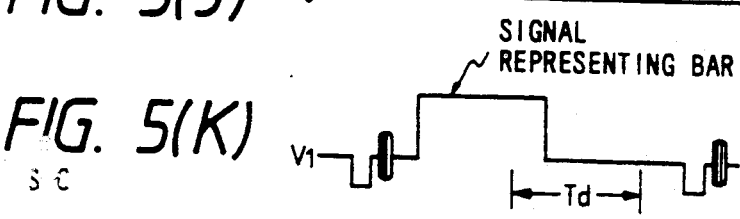

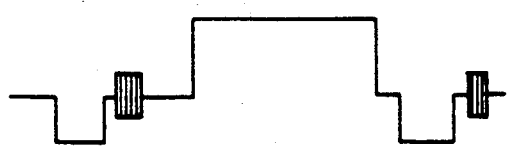
FIG. 5(L)
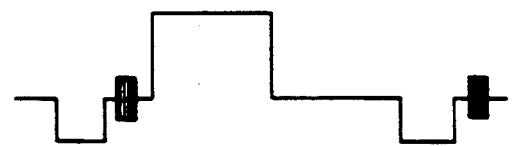
FIG. 5(M)
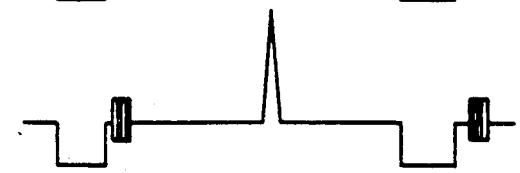
FIG. 5(N)
FIG. 5(O)
FIG. 6(A)
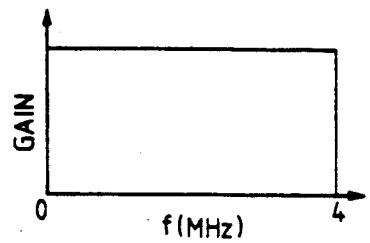
FIG. 6(B)
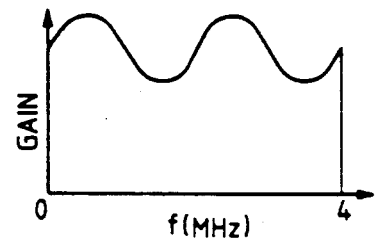
FIG. 7
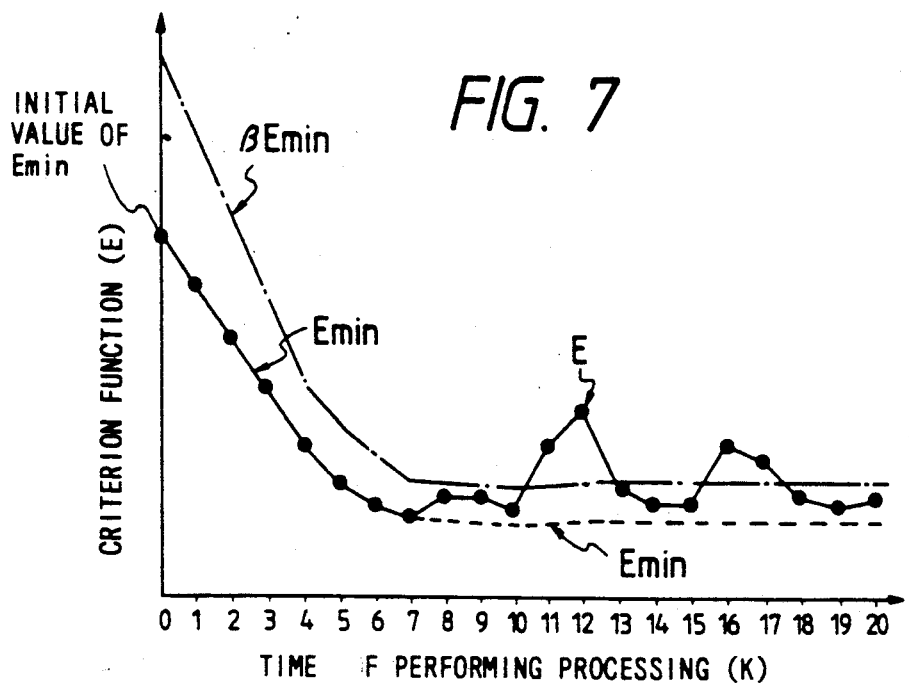

GHOST CANCELLING DEVICE USING VARIABLE AMPLIFIER CONTROLLED BY CRITERION FUNCTION

BACKGROUND OF THE INVENTION

1. Field of the Invention

This invention generally relates to a device for cancelling ghost and more particularly to a ghost cancelling device (hereunder sometimes referred to as a ghost canceller) for removing ghost or waveform distortion included in video signals inputted in various kinds of video equipment (for example, a television (TV) receiver) for processing TV video signals.

2. Description of the Related art

First, a typical one of conventional ghost cancellers will be described hereinbelow by referring to FIG. 2 (A) which is a schematic block diagram for showing the construction of this conventional ghost canceller 1. In this figure, reference numeral 11 indicates a filtering portion; 12 a weight setting circuit; 13 a waveform extracting circuit; 14 a peak detecting circuit; 15 an arithmetic mean processing circuit; 17 a subtracter; 18 a reference waveform generating circuit; and 36 an amplifier. By employing such a configuration, this conventional ghost canceller removes waveform distortion generated due to ghost interference and so on from video baseband signals.

Next, an operation of the ghost canceller 1 will be described hereinbelow by referring to FIGS. 2 (A) thru 6.

First, digital input video signals (hereunder referred to simply as input video signals) $\{X_n\}$ coming from a line $l_1$ are supplied to the filtering portion 11. As shown in FIG. 3, the filtering portion 11 is a filter composed of a finite impulse response (FIR) filter 21, of which the transfer function is denoted by Ga(f) herein, and an infinite impulse response (IIR) filter 22. Further, the IIR filter 22 is composed of an FIR filter 23, of which the transfer function is denoted by Gb(f) herein, and a subtracter 39. Thus, the transfer function G(f) of the filtering portion is given by using the transfer functions Ga(f) and Gb(f) as follows:

$$G(f) = Ga(f)/\{1 + Gb(f)\} \quad (A1).$$

In addition, the FIR filters 21 and 23 are respectively constructed as shown in FIGS. 4 (A) and (B). That is, as shown in FIG. 4 (A), the FIR filter 21 is a transversal filter comprising a delay block 26 composed of N delay circuits 25 connected in series, a weighting block 37 composed of N+1 weighting circuits 31 each connecting to an input or output terminal of a corresponding one of the delay circuits 25 and an adding and synthesizing circuit 30 to be used for adding and synthesizing an output signal of each of the weighting circuits 31 and a main signal outputted from the delay block 26 through a line $l_5$. Further, the delay time T of the delay circuit 25 is given by, for example, $$T = 1/f_{sc}$$

where $f_{sc}$ is the frequency of a chrominance sub-carrier and is nearly equal to 3.58 MHz. When controlling the main signal, the FIR filter 21 operates to control a weight (gain) $a_N$ of the weighting circuit 31, and on the other hand, when controlling removing a pre-ghost and a waveform distortion component prior to the main signal, the filter 21 operates to control the respective weights $a_0$ thru $a_{N-1}$ of the weighting circuits 31.

Further, the FIR filter 23 of the IIR filter 22 is, as shown in FIG. 4 (B), a transversal filter comprising a delay block 27 composed of M+1 delay circuits 25 connected in series each of which has the delay time T, a weighting block 38 composed of M+1 weighting circuits 32 each connected to an output or input terminal of a corresponding one of the delay circuits 25 as shown in the figure and an adding and synthesizing circuit 30 for adding and synthesizing output signals of each of the weighting circuits 32. This FIR filter 23 operates to remove a post-ghost or a waveform distortion component posterior to and added to the main signal.

The respective weights of the FIR filters 21 and 23 of the filtering portion 11 are controlled by the weight setting circuit 12. Further, outputs $\{Y_n\}$ of the filtering portion 11 are drawn from a line $l_2$ as output video signals and are simultaneously supplied to a waveform extracting circuit 13.

Now, among the input video signals $\{X_n\}$ applied from the line $l_1$, are shown in FIG. 5 (A) a sequence of signals of one horizontal scanning interval on which reference signals to be used for detecting waveform distortion such as a ghost are superposed, assuming that the electric potential of a blanking level is set as $V_1$. In case where all the values of the weights of the filtering portion 11 are zero, the input video signals $\{X_n\}$ are drawn from the line $l_2$ as the output video signals $\{Y_n\}$ without being changed. Incidentally, the time delay of the signals occurring in these circuits due to processing time is omitted herein for simplicity of description. Further, the signals will be treated in similar fashion in the following description.

Referring to FIG. 5 (B), there is shown a section Td of a signal of FIG. 5 (A), which is to be used for detecting the waveform distortion such as a ghost on the basis of a reference signal $\rho$, by enlarging the section Td in the direction of an axis of abscissa representing time (hereunder referred to as a time axis). The waveform extracting circuit 13 operates to extract this section Td of the signal. Further, there is shown in FIG. 5 (C) the waveform of the signal in case where a ghost $\delta$ and noises are mixed with the signal of FIG. 5 (B). Such a signal is then supplied to the peak detecting circuit 14 of the next stage. The peak detecting circuit 14 includes a comparator for comparing a level of the input signal with a reference value, a counter for measuring an elapsed time since the starting point of the section Td and a memory or latch circuit for storing the counted value of the position of the peak and so on. In this peak detecting circuit 14, the time at which the signal reaches the maximum value (or the peak value) thereof, that is, the position of the peak in the section Td is detected as 0. Outputs of the peak detecting circuit 14 are supplied to an arithmetic mean processing circuit 15 of the next stage. This arithmetic mean processing circuit 15 includes a memory circuit for storing the signal of the section Td and adders and so on. In this arithmetic mean circuit processing 15, signals, each of which has a waveform as shown in FIG. 5 (C) and is repeatedly inputted every field or frame during a vertical retrace line interval, are added a predetermined number of times in a synchronous manner and then averaged. By such processing of obtaining the arithmetic mean of the signals, noise components having no correlation with the signal can be sufficiently suppressed and thus signals $\{Y_n'\}$ shown in FIG. 5 (D) are obtained. In case where the inherent spectrum distribution of the reference signal $p$ of FIG. 5 (B) is flat as shown in FIG. 6 (A), the spectrum distribution of the signal including a ghost $\delta$ as shown in FIG. 5 (D) exhibits a characteristic as shown in FIG. 6 (B) in which fluctuation indicating waveform distortion components generated due to the ghost occurs in the range of frequency from 0 to 4 MHz. Such signals $\{Y_n'\}$ are supplied to a positive input terminal of the subtracter 17.

The reference waveform generating circuit 18 generates a reference signal $\{\gamma_n\}$ having a reference waveform as shown in the waveform diagram of FIG. 5 (E) as well as an ideal spectrum distribution as shown in FIG. 6 (A) in synchronization with the position of the peak detected by the peak detecting circuit 14. By subtracting such a reference signal $\{\gamma_n\}$ from the signal $\{Y_n'\}$ supplied from the arithmetic mean processing circuit 15 by the subtracter 17, a waveform distortion signal $\{\epsilon_n\}$ is obtained as shown in FIG. 5 (F). Further, by multiplying the waveform distrotion signal $\{\epsilon_n\}$ by an appropriate magnification a which is less than 1, an amplifier 36 of the next stage obtains a signal $\{a\ \epsilon_n\}$, which is hereunder represented by $\{\epsilon_n'\}$, as shown in FIG. 5 (G). The weight setting circuit 12 detects the position of the peak of the waveform distortion signal $\{\epsilon_n'\}$, the width of the waveform distortion in the time axis and the amplitude ratio of the waveform distortion to the peak. Furthermore, the weight setting circuit 12 calculates weights $\{\omega_n\}$ which can minimum the distortion and then sets such weights at each of the weighting circuit 31 and 32 respectively composing a weighting block 37 and 38 which further composes the FIR filters 21 and 23 of the filtering portion 11. This weight setting circuit 12 is comprised of a microprocessor or a microcomputer and so on from necessity of function of carrying out operations or processing, thereby repeatedly performing calculation and setting of weights $\{\omega_n\}_k$ (see FIG. 5 (H)) on the basis of the following equation.

$$\{\omega_n\}_k = \{\omega_n\}_{k-1} - \{\epsilon_n'\}_k \quad (A2)$$

where k satisfies the following inequality $1 \leq k \leq m$ in which m denotes the number of repetition of processing to be required to obtain convergence of the value of the weight $\{\omega_n\}_k$. Further, in the above equation, n denotes an order number of data in a sequence thereof and $\{\omega_n\}_k$ denotes the values of weights calculated at k'th time of iteration of processing.

Incidentally, the calculated weights $\{\omega_n\}_k$ are set in corresponding taps of the transversal filters composing the filtering portion 11.

The method of sequentially updating the detected and inverted component of the waveform distortion as above stated is theoretically correct. The above described algorithm used in the prior art is a kind of Zero Forcing (ZF) Method and performs control of the waveform distortion in proportion to the amplitude thereof. Thus, this method is a preferable control method having the advantage of relatively quick convergence. Furthermore, in case of this conventional method, video signals, from which the waveform distortion such as a ghost is removed, ought to be obtained by weighting the taps of the filters of the filtering portion 11 such that the distortion is minimized. Such a conventional apparatus, however, has a problem that if an external dis ance such as a noise enters the apparatus when the estimated weight approaches a true optimum value to some extent, the estimated weight then converges to a stable value different from the true optimum value and on the other hand, in the IIR filter, the estimated weight oscillates or diverges.

Regarding a mean square value of the waveform distortion component data in the section Td, which is to be detected, as a criterion function, as the number of iterative processing increases after the control operation is commenced, the value of the criterion function gradually decreases until reaches a minimal value. Thereafter, the value of the criterion function inversely oscillates and goes away from this minimal value. Further, the value of the criterion minutely oscillates around a value different from the true value to be reached. Alternatively, the value of the criterion function sometimes increases and diverges. Consequently, the conventional method has encountered a serious problem with respect to stability of operations of the conventional apparatus that for example, a ghost cancelling operation thereof is seriously hindered. Thus, the conventional method is impractical.

Turning now to FIG. 2 (B), there is shown another prior art ghost cancelling device (hereunder sometimes referred to as a second prior art ghost canceller). In this figure, reference numeral 11 denotes a filtering portion which is a synthesized filter including FIR and IIR filters; 12 a weight setting circuit; 13 a waveform extracting circuit; 114 a subtracter; 16 a magnification setting circuit; and 18 a reference waveform generating circuit.

Input digital video signals supplied from an input line $l_1$ are taken out of a line $l_2$ as output video signals through the filtering portion 11 and are also supplied to the waveform extracting circuit whereupon a portion of the signal corresponding to a predetermined interval (for example, one horizontal scanning interval) including a reference signal is extracted.

Here, a reference waveform of the signal for detecting waveform distortion such as a ghost in the input video signals will be described by referring to FIG. 5. In FIGS. 5 (L) and (M), are shown step-like or rectangular signals superposed on the video signal of a horizontal scanning interval. In case of FIG. 5 (L), a leading edge of the step-like signal is used as a reference signal. Further, in case of FIG. 5 (M), a trailing edge of the step-like signal is used as a reference signal. In these cases, frequency characteristics of the signals in the vicinities of the leading and trailing edges thereof are preliminarily prescribed.

Further, FIG. 5 (N) shows a pulse-like signal superposed on the video signal of a horizontal scanning interval. In this case, frequency characteristic of the signal in the vicinity of the pulse is preliminarily prescribed. Differentiation of the leading and trailing portions of the step-like signals provide pulses as shown in FIG. 5 (N). FIG. 5 (O) shows a vertical synchronization signal of which the trailing portion can be used as a reference signal.

The waveforms of the above described various reference signals are periodically extracted by the waveform extracting circuit 13 and the extracted signal is supplied to a subtracter 141 of the next stage. In the waveform extracting circuit 13, the conversion (for example, differentiation) of the waveform is effected in accordance with the reference signal taken thereinto. Outputs of the waveform extracting circuit 13 are sent to the subtracter 141 whereupon the waveform of the output signal is compared with the inherent waveform (that is, the internal reference waveform) of the reference signal preliminarily calculated in the reference waveform generating circuit 18. The magnification setting circuit 16 establishes a certain magnification on the basis of the results of this comparison. Further, the gains of taps of each of the filters composing the filtering portion 11 are determined in the weight setting circuit 12. The prior art ghost cancelling device is intended to output video signals in which ghosts are cancelled. Incidentally, the weight setting circuit 12 is often constructed by using a microcomputer or microprocessor because of the necessity of a computing function. Further, the description of a delay of the signal generated in the thus constructed signal processing circuit due to the various processing is omitted for convenience of explanation. In the following descriptions of the invention, the delay of the signal will be treated in the same manner.

Further, in this conventional ghost cancelling device (that is, the second prior art ghost canceller), the weights (that is, the gains of the taps of the FIR and IIR filters composing the filtering portion 11) are set on the basis of a signal representing the difference between the reference waveform taken into the waveform extracting circuit 13 and the internal reference waveform calculated in the reference waveform generating circuit 18. At that time, the magnification is constant. Thus, the prior art ghost cancelling device has a problem that for instance, in case where a signal-to-noise ratio (S/N) is small, a false ghost is generated (that is, an erroneous gain of the tap is established) every processing due to noises so that the convergence of the state of the device to a state, in which ghosts are cancelled, becomes slow, that is, it takes long time to settle the device in a state in which the ghosts are cancelled.

Turning to FIG. 2 (C), there is shown still another prior art ghost cancelling device (hereunder sometimes referred to as a third prior art ghost canceller). In this figure, reference numeral 11 indicates a filtering portion (which is a synthesized filter composed of the FIR and IIR filters); 12 a weight setting circuit; 13 a waveform extracting circuit; 14 a peak detecting circuit; 15 an arithmetic mean processing circuit; 116 a waveform converting circuit; 17 a substracter; and 18 a reference waveform generating circuit.

Input digital video signals supplied from an input line $l_1$ are drawn out of a line $l_2$ as output video signals through the filtering portion 11 and are also supplied to the waveform extracting circuit 13 whereupon a portion of the signal corresponding to a predetermined interval (for instance, one horizontal scanning interval) including a reference signal is extracted.

Hereinafter, a reference waveform of the signal for detecting waveform distortion such as a ghost in the input video signals will be described by referring to FIG. 5. Similarly as in case of the second prior art ghost canceller, in FIGS. 5 (L) and (M), are shown step-like or rectangular signals superposed on the video signal of a horizontal scanning interval. Further, in case of FIG. 5 (L), a leading edge of the step-like signal is used as a reference signal. Furthermore, in case of FIG. 5 (M), a trailing edge of the step-like signal is used as a reference signal. In these cases, the frequency characteristics of the signals in the vicinities of the leading and trailing edges thereof are preliminarily determined.

Further, FIG. 5 (N) shows a pulse-like signal superposed on the video signal of a horizontal scanning interval. In this case, the frequency characteristic of the signal in the vicinity of the pulse is preliminarily determined. By differentiating the leading and trailing portions of the step-like signals, are obtained pulses as shown in FIG. 5 (N). Moreover, FIG. 5 (O) shows a vertical synchronization signal of which the trailing portion may be also used as a reference signal.

The waveforms of the above described various reference signals are (periodically) extracted by the waveform extracting circuit 13 and the extracted signal is supplied to the peak detecting circuit 14 of the next stage. In the peak detecting circuit 14, the value in the time axis is corrected by detecting a reference time (corresponding to, for instance, the leading or trailing edge of the step-like reference signal or to the peak of the pulse-like reference signal) in a constant interval. That is, the peak detecting circuit 14 is used for preventing malfunction at the time of the arithmetic mean processing and of the comparison of the waveform of a signal outputted from the wave form converting circuit 116 with that of the reference signal effected in the arithmetic mean processing circuit 15. Particularly, the circuit 14 is composed of a comparator for comparing the level of the input signal with the reference value, a counter for measuring a time elapsed since a starting point of a predetermined interval and a memory (or latch) circuit for storing the counted value of the position of the peak.

After the steps of the process up to the operation of the peak detecting circuit are repeated, the output signal of the circuit 14 is supplied to the arithmetic mean processing circuit 15 of the next stage and random noises included in the reference signal portion of the input video signals are reduced. This arithmetic means processing circuit 15 comprises a memory circuit for storing a portion of the inputted signal corresponding to the predetermined interval and adders. The output thereof is supplied to the waveform converting circuit 161 which is comprised of gate circuits, comparators, a memory circuit and a substracter and so on and effects the conversion (for instance, differentiation) of the waveform in accordance with the reference waveform. The reference waveform generating circuit 18 generates the inherent reference waveform (that is, the internal reference waveform) in synchronization with the position of the peak detected by the peak detecting circuit 14. Such an internal reference signal is compared with or substracted from the output of the waveform converting circuit 161 (that is, a reference signal extracted from the input signal) by the waveform comparing circuit 17. On the basis of the result of the comparison (for example, the difference between them), the waveform of the output of the waveform comparing circuit 17 is converted (by, for instance, multiplying the output thereof by a certain magnification and adding the result to the current gains of the taps) and the gains of the taps of the filtering portion 11 are determined. This prior art ghost cancelling device is intended to output video signals in which ghosts are cancelled. Further, the weight setting circuit 12 may be constructed by using a microcomputer or microprocessor because of the necessity of a computing function. Incidentally, the description of a delay of the signal generated in the thus constructed signal processing circuit due to the various processing is omitted for convenience of explanation.

Meanwhile, in this ghost canceller, there are two types of methods of controlling the determination of the gains of taps. One of them is a feedback type control method by which the extraction of the reference signal is effected at the output side of the filtering portion 11 through a line l₄ and further the gains of the taps are serially updated. The other is a feedforward type method by which the extraction of the reference signal is effected at the input side of the filtering portion 11 through a line l₃ and further the determination of the gains of the taps is not based on the outputs of the filters obtained by using the previously determined gains of the taps. However, in any case of using these methods, random noises components included in the reference signal portions of the input video signals are reduced by the arithmetic mean processing circuit.

Furthermore, in order to prevent the generation of the false ghost, that is, the erroneous setting of the weight data when the weights are set (that is, the gains of the taps of the FIR and IIR filters composing the filtering portion 11), it is necessary to perform adding and averaging operations of more than a considerable number every calculation of data. Thus, this conventional ghost cancelling device has a problem that it takes time to calculate the weight data at a time and the value of S/N obtained as the results of the total arithmetic mean processing is not more than that of S/N obtained as the result of performing the arithmetic mean processing one time.

The present invention is accomplished to resolve the above described problems of the prior art.

SUMMARY OF THE INVENTION

To achieve the foregoing object and in accordance with a first aspect of the present invention, there is provided a ghost cancelling device which comprises a filter responsive to the input video signal for deriving an output video signal. A weight setting circuit controls the frequency response of the filter.

In accordance with another aspect of the invention there is provided means for deriving a first digital signal by converting the waveform of or extracting a digital signal of a predetermined period of time such as a pulse-like signal to be used for detecting a ghost, means for detecting the position in the time axis of a peak of the first signal and generating a signal having a reference waveform at the time corresponding to the detected position in the time axis of the peak, a subtracting means for obtaining a second signal by inputting the first signal and the signal having the reference waveform and subtracting the signal having the reference waveform from the first signal, a variable amplifier for controlling the value of the second signal data, means for obtaining a criterion function by calculating mean square value of the second signal data or averaging the sum of absolute values of the second signal data, an amplification factor setting means for setting an amplification factor corresponding to the value of the criterion function only in case where the value of the criterion function is less than the value $\beta$ times a minimum value of the criterion function ($\beta$ is a predetermined value greater than 1) obtained prior to a predetermined time and means for setting the value of the criterion function as the minimum value of the criterion function only in case where the value of the criterion function is less than the minimum value thereof obtained prior to a predetermined time, wherein a ghost cancelling operation is performed by controlling a gain of the variable amplifier used to control the value of the second signal data by the amplification factor setting means.

Thereby, the problems of external disturbance (for example, noises) of the prior art apparatus can be resolved. That is, the ghost canceller according to the first aspect of the present invention can perform an ghost cancelling operation by continually checking whether or not the values of the weights are converging by using the criterion function. Thus, the ghost canceller according to the first aspect of the present invention can provide substantial advances in resistance to noises, that is, can be substantially less subject to noises than the prior art ones. Further, the ghost canceller according to the first aspect of the present invention has practically the advantage that it can stably and surely perform an operation of removing waveform distortion at a high precision and as a result, can obtain good video signals having substantially no waveform distortion.

In accordance with a further aspect of the present invention, there is provided a ghost cancelling device which comprises a filtering means for removing waveform distortion such as a ghost from television digital video signals, means for deriving a first signal by converting the waveform of or extracting a signal of a predetermined period of time such as a pulse-like reference signal to be used for detecting a ghost, means for generating a signal having a reference waveform by adjusting the timing of the generation to the first signal, a substracting means for obtaining a second signal by inputting the first signal and the signal having the reference waveform and subtracting the signal having the reference waveform from the first signal, means for obtaining a criterion function by calculating means square value of the second signal data or averaging the sum of absolute values of the second signal data, an arithmetic mean accumulating and averaging means for obtaining a third signal by performing arithmetic means accumulating and averaging processing of the second signal data, a synthesizing means for obtaining a fourth signal by adding and synthesizing the second signal and the third signal at a predetermined ratio, a variable amplifier for controlling the value represented by the fourth signal and an amplification factor setting means for setting an amplification factor when the value represented by the third signal as well as the weights already established in the filtering means is effective on the basis of the relation between the current value of the criterion function and the minimum of the value of the criterion function obtained by that time, wherein the values of the weights to be established in the filtering means are updated by controlling the gain of the variable amplifier for controlling the value represented by the fourth signal by use of the amplification factor setting means.

Thereby, the problems of external disturbance of the conventional device can be also resolved. That is, the ghost canceller according to the second aspect of the present invention can perform an ghost cancelling operation by introducing a criterion function thereinto and continually checking whether or not the values of the weights are converging by using the criterion function, and further the ghost canceller according to the second aspect of the present invention is adapted to be able to set weights of the filtering means only when the value represented by the waveform distortion accumulating signal and those of the already established weights are significant. Thus, the ghost canceller according to the second aspect of the present invention can substantially increase resistance to noises and stability in operations in contrast with the prior art devices by effectively masking noises and performing the ghost cancelling operation by checking the correlation between the current status thereof and the progress of the processing up to the present. Further, the ghost canceller according to the second aspect of the present invention can compensate shortage of the sensitivity liable to occur in case of performing the ZF method which decreases the waveform distortion component by serial processing. Thus, the ghost canceller according to the second aspect of the present invention also has the advantage that it can stably and surely perform an operation of cancelling ghosts and also can obtain video signals of good quality having substantially no waveform distortion.

In accordance with an additional aspect of the present invention, there is provided a ghost cancelling device which comprises a filtering means for removing waveform distortion such as a ghost from television digital video signals, means for deriving a first signal by converting the waveform of or extracting a signal of a predetermined period of time such as a pulse-like reference signal to be used for detecting a ghost, means for generating a signal having a reference waveform by adjusting the timing of the generation to the first signal, a subtracting means for obtaining a second signal by subtracting the signal having the signal having the reference waveform from the first signal, an arithmetic mean accumulating and averaging means for obtaining a third signal by effecting arithmetic mean accumulating and averaging processing of the second signal data, a synthesizing means for obtaining a fourth signal by adding and synthesizing the second signal and the third signal at a appropriate ratio, means for obtaining a criterion function by obtaining mean square value or averaging a sum of absolute value of the quantity represented by the fourth signal, a variable amplifier for controlling the value represented by the fourth signal and an amplification factor setting means for setting an amplification factor on the basis of the relation between the value of the obtained criterion function and the minimum of the value of the criterion function previously obtained by a predetermined time, wherein the values of the weights to be set in the filtering means are serially updated by controlling the gain of the variable amplifier for controlling the value represented by the fourth signal by use of the amplification factor setting means.

Thereby, the problems of external disturbance of the conventional device can be also resolved. Further, the technical effects similar to those of the ghost cancelling device according to the second aspect of the present invention can be obtained.

In accordance with an added aspect of the present invention, there is provided a ghost cancelling device which includes, in addition to the composing elements of the prior art device, a maximum amplitude detecting circuit for detecting a maximum amplitude of an error signal coming from a subtracting circuit, a first comparator for comparing the maximum amplitude of the error signal detected by the maximum amplitude detecting circuit with a minimum value of the maximum amplitude of the error signal which value is already stored and updating the minimum value of the maximum amplitude of the error signal, a criterion function calculating circuit for calculating the value of the criterion function on the basis of the error signal, a second comparator for comparing the criterion function obtained by the criterion function calculating circuit with a minimum value of the criterion function which value is already stored and updating the criterion function and a synthesizing circuit for respectively multiplying output signals of the first and second comparators by magnifications which are within certain tolerances and then synthesizing the thus modified output signals of the first and second comparators and further supplying the synthesized signal to the magnification setting circuit, wherein at the time of converting the error signal coming from the subtracting signal into weighting data, a conversion parameter is changed by using both of the maximum amplitude of the error signal and the criterion function calculated on the basis of the error signal, whereby a ghost is cancelled.

Thereby, the problem of a false ghost of the prior art ghost cancelling device can be resolved.

In accordance with a still further aspect of the present invention, there is provided a ghost cancelling device which includes, in addition to the composing elements of the prior art device, an arithmetic mean accumulating and averaging circuit for gradually reducing noise component in a portion of a signal of a constant interval including a reference signal by using the value of an arithmetic mean calculated by an arithmetic mean processing circuit a given time by accumulating the value of the arithmetic mean to use the value of the arithmetic mean the next time, a processing time counting circuit for counting the times of updating of the weights or the gains of taps effected in the weight setting circuit since a ghost cancelling operation is started and a criterion function calculating circuit for calculating the criterion function on the basis of the waveform taken into the waveform extracting circuit, wherein the times of effecting the arithmetic mean processing and various parameters are automatically changed on the basis of the number of times of updating of the weights or gains of taps since the commencing of the ghost cancelling operation obtained by the processing time counting circuit and the criterion function obtained by the criterion function calculating circuit so that the times of performing the arithmetic mean processing is reduced in initial stage of the ghost cancelling operation, in which quick processing is required, to immediately advance to the calculation of the weighting data and thereafter the times of effecting the arithmetic mean processing is gradually increased in the succeeding stages of the ghost cancelling operation in order to obtain the weighting data of high precision.

Thereby, the problem of a large number of the times of effecting the arithmetic mean processing and that of S/N of the prior art ghost cancelling device can be resolved.

BRIEF DESCRIPTION OF THE DRAWINGS

Other features, objects and advantages of the present invention will become apparent from the following descriptions of preferred embodiments with reference to the drawings in which like reference characters designate like or corresponding parts throughout several views, and in which:

FIG. 2 (B) is a schematic block diagram for showing the configuration of another prior art ghost canceller;

FIG. 2 (C) is a schematic block diagram for showing the configuration of still another prior art ghost canceller;

FIGS. 5 (A) to (O) are waveform diagrams for illustrating operations of portions composing the ghost cancellers of FIGS. 1, 2 and 9;

FIGS. 6 (A) and (B) are graphs of spectrum distributions for illustrating operating principles of the ghost cancellers of FIGS. 1 and 2, respectively;

FIG. 7 is a graph for showing the characteristic of an example of a criterion function used in a criterion function setting circuit of the ghost canceller of the present invention;

DETAILED DESCRIPTION OF PREFERRED EMBODIMENTS

Hereinafter, preferred embodiments of the present invention will be described in detail by referring to the accompanying drawings.

Before explaining the detail of a first embodiment of the present invention, it is to be noted that the ghost canceller of the present invention performs a ghost cancelling operation not simply by sequentially modifying the weights applied to taps of the transversal filters of the filtering portion but further by introducing a criterion function for evaluating quantity of the waveform distortion component thereinto and then sequentially effecting a weighting operation under condition that the value of the criterion function is to decrease, whereby the ghost cancelling operation is stably performed.

Now, a first embodiment of the present invention will be explained hereunder by referring to the accompanying drawings.

Figure 1:
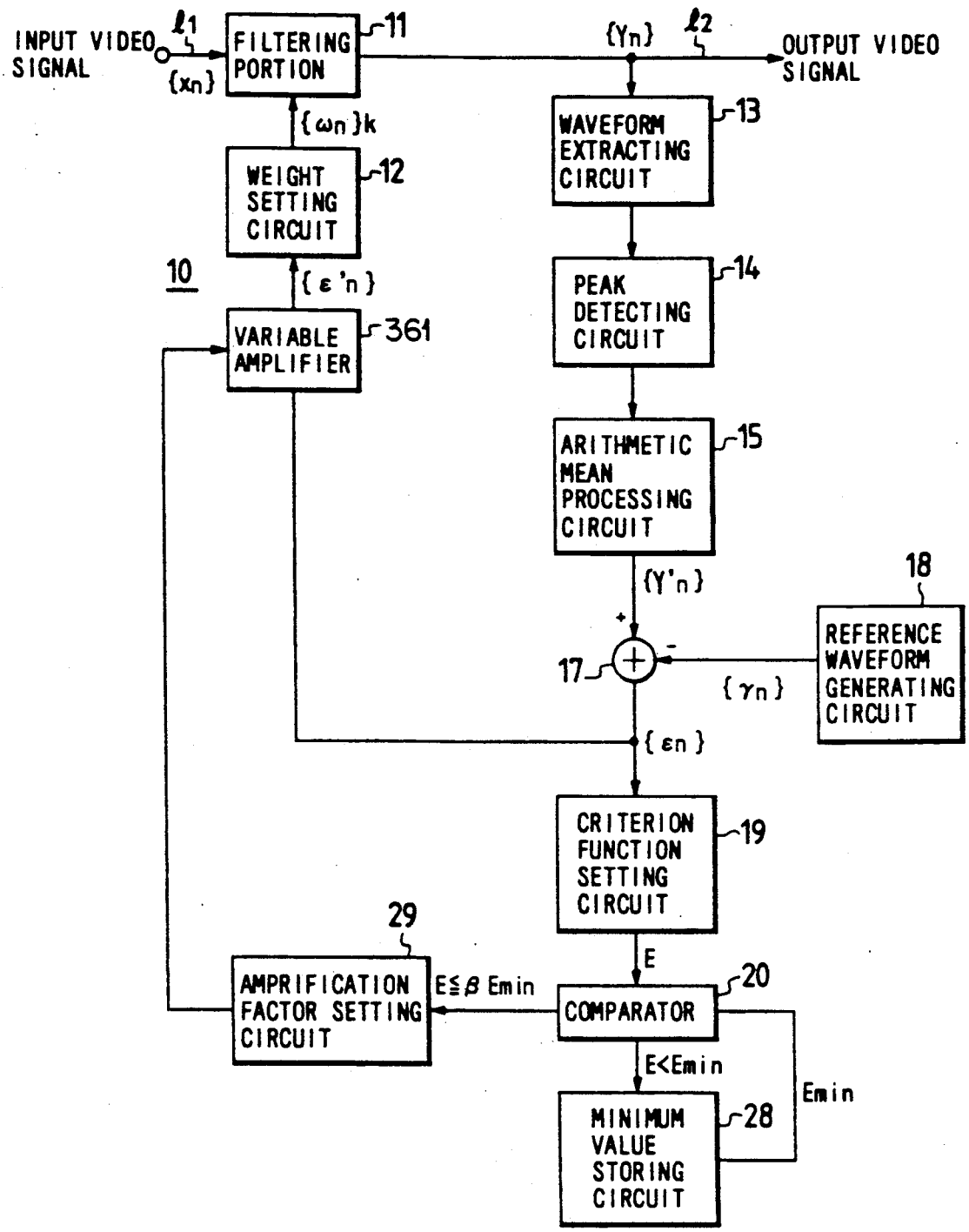
FIG. 1 is a schematic block diagram for showing the configuration of a first ghost canceller of the present invention.
Figure 2A:
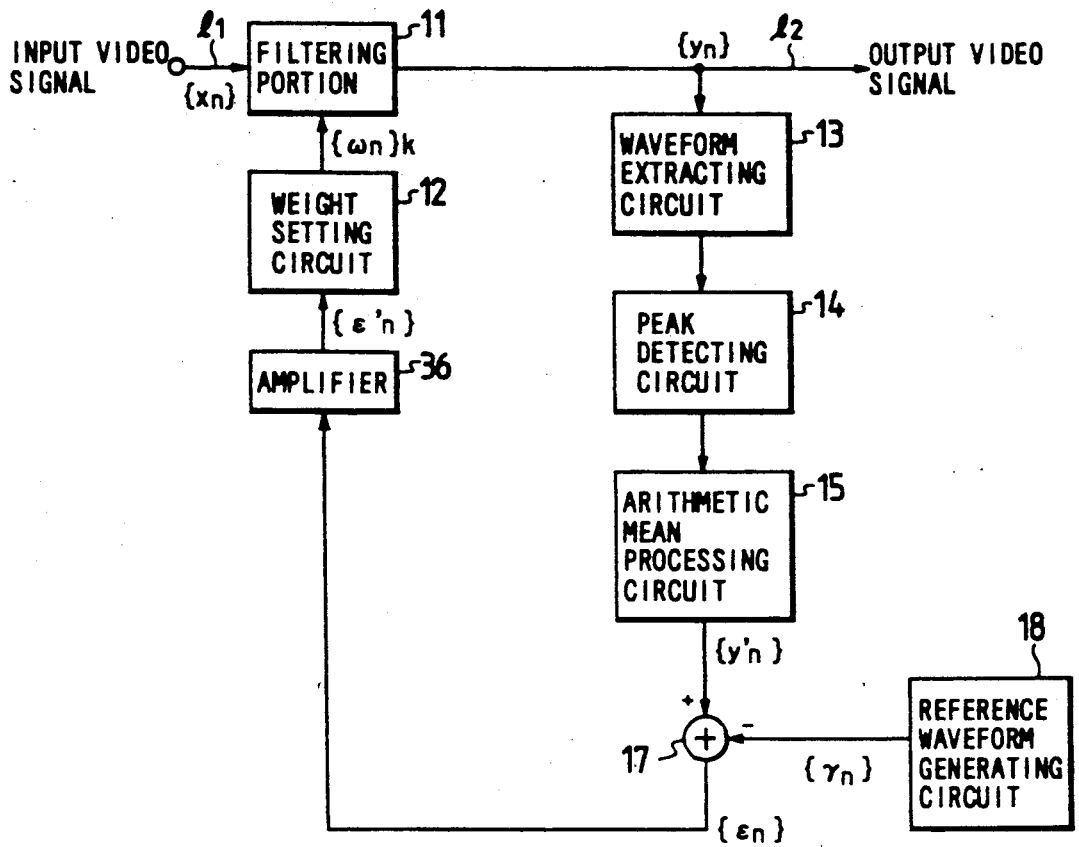
FIG. 2 (A) is a schematic block diagram for showing the configuration of a prior art ghost canceller.
Figure 2B:
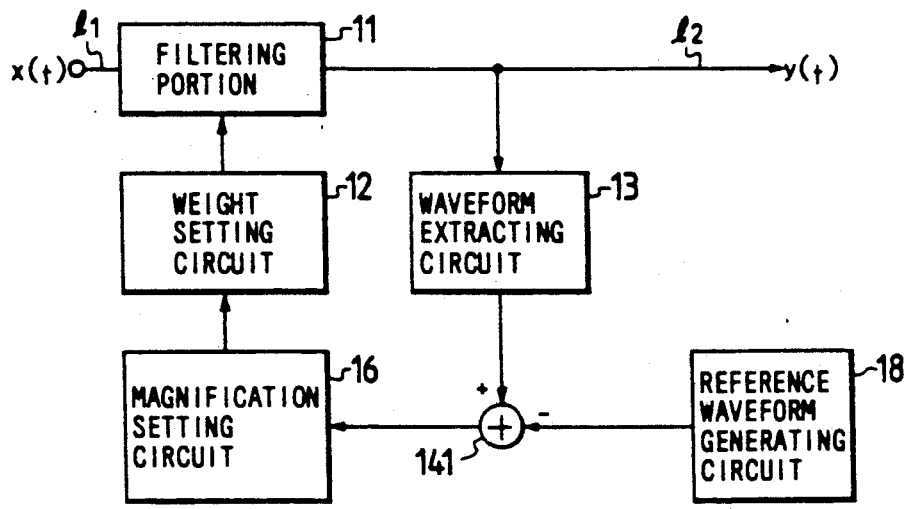
Figure 2C:
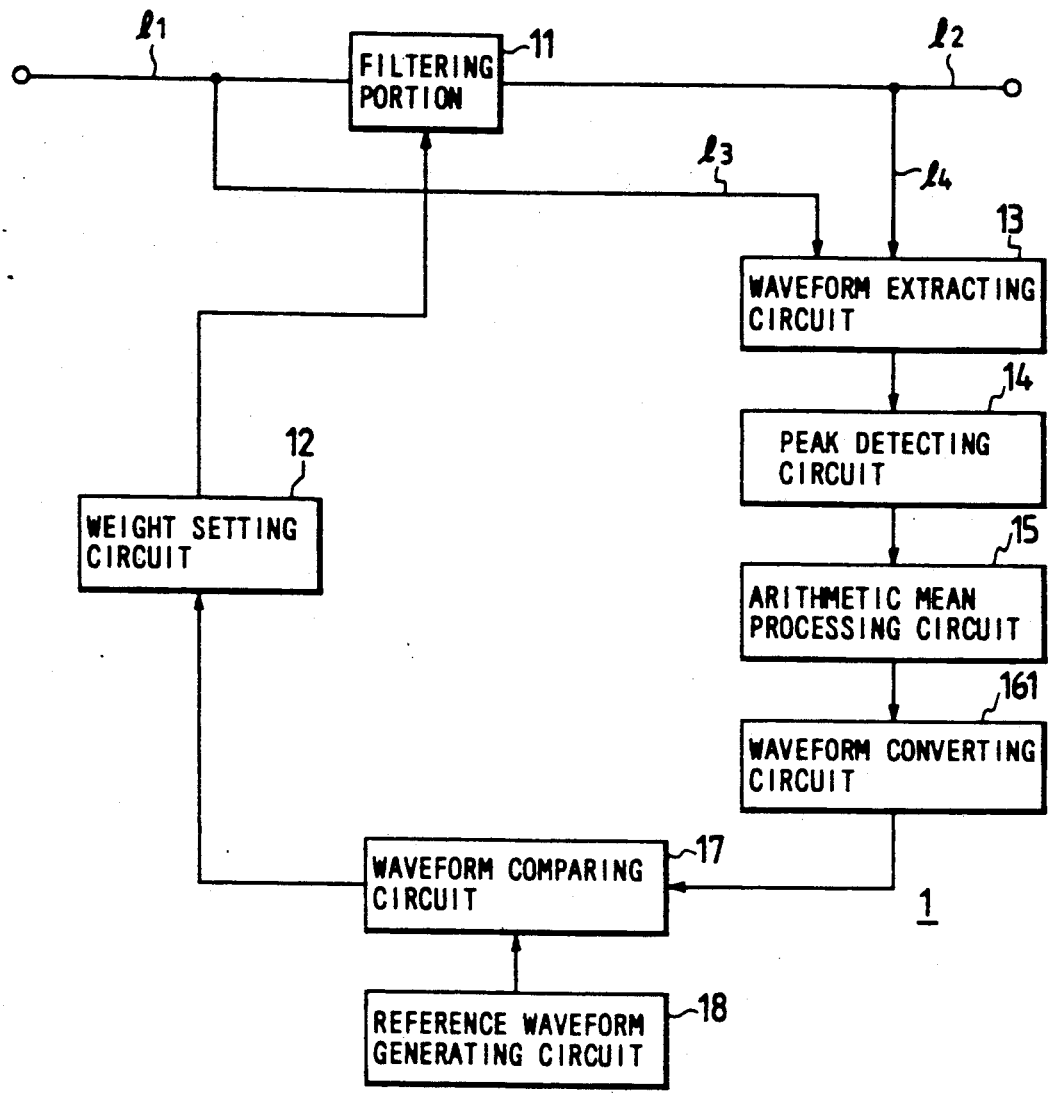
Figure 3:
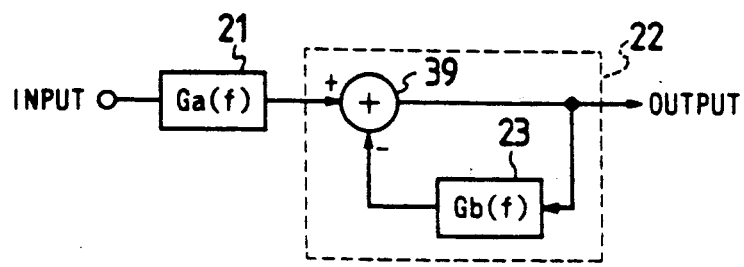
FIG. 3 is a schematic block diagram for showing the detailed configuration of a filtering portion of the ghost cancellers of FIGS. 1 and 2.
Figure 4A:
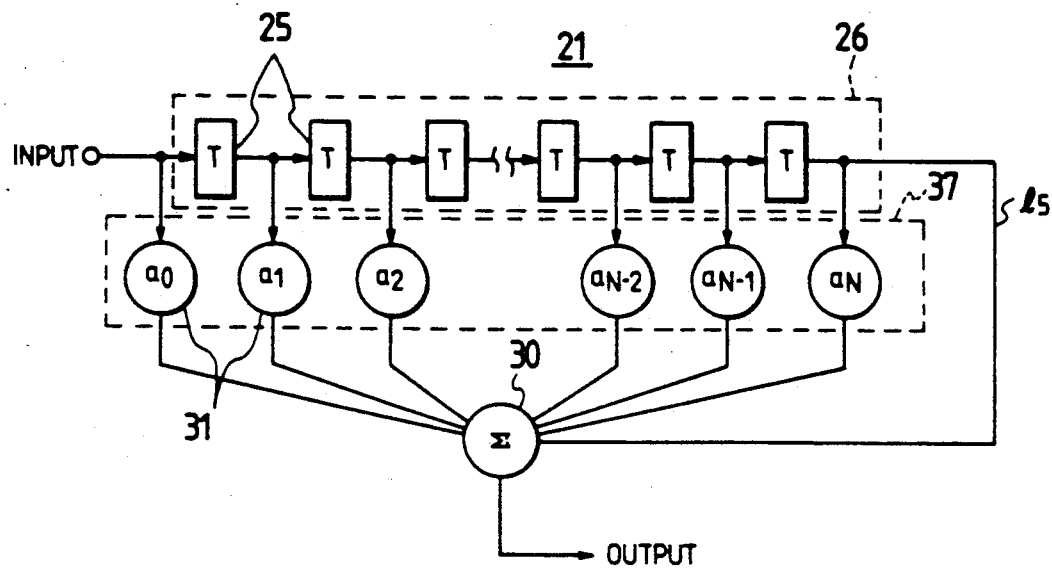
FIGS. 4 (A) and (B) are circuit diagrams for showing FIR filters composing the filtering portion.
Figure 4B:
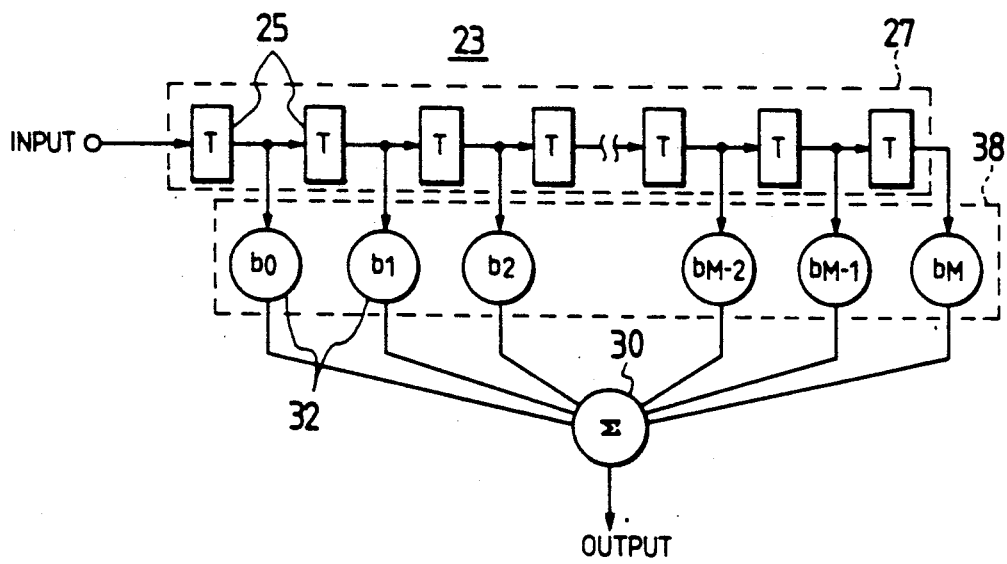

Referring first to FIG. 1, there is shown a first ghost canceller 10 embodying the present invention. In this figure, like reference characters refer to like or corresponding portions of the prior art devices shown in FIG. 2. Thus, the detailed descriptions of such portions of the first embodiment will be omitted. As is apparent from a comparison between FIGS. 1 and 2, the primary characteristic aspect of this ghost canceller 10 according to the present invention resides in that a variable amplifier 361 is provided in place of the amplifier 36 of the conventional device 1, that the amplification factor of the amplifier 361 is adapted to be controlled by an additional circuit and that a criterion function setting circuit 19 is introduced thereinto and in addition a weighting circuit 12 operates only when the value of a criterion function are decreasing. In order to implement such an operation thereof, the first ghost canceller is provided with a comparator 20, a minimum value storing circuit 28 and an amplification factor setting circuit 29 in addition to the variable amplifier 361 and the criterion function setting circuit 19, which are connected to each other as shown in FIG. 1.

Next, an operation of this ghost canceller 10 according to the present invention will be described by referring to the waveform diagram shown in FIG. 5. Input digital video signals $\{X_n\}$ used in a television (TV) system conforming to standards adopted by the National Television Committee (NTSC), which are supplied from a line $l_1$ to a filtering portion 11, are taken out as output video signals $\{Y_n\}$ from a line $l_2$ without being changed in the beginning. This output signal represents a horizontal scanning interval in which a reference signal used for detecting waveform distortion such as a ghost superposed on a portion of a video signal corresponding to a vertical retrace interval is present. Further, in this output signal, a period of a detection period Td for detecting waveform distortion such as a ghost is extracted by a waveform extracting circuit 13 (see FIGS. 5 (B) and (C)).

The waveform extracting circuit 13 has a function of clamping an electric potential and operates to detect an electric potential at a time PK, which is, as shown in FIG. 5 (B), immediately before a reference signal $p$ occurs, and shifts the direct current (DC) level of the output signal in such a manner to change the level of the detected potential into 0. Further, the position of a peak of the reference signal $p$ in the waveform of an output signal of the waveform extracting circuit 13 is detected by a peak detecting circuit 14. Then, an output of the peak detecting circuit 14 is supplied to an arithmetic mean processing circuit 15 of the next stage, whereupon the outputs of the peak detecting circuit 14 are synchronously added predetermined number of times on the basis of the position of the peak averaged. By such arithmetic mean processing, the noise component shown in FIG. 5 (D) having no correlation with the signal is sufficiently suppressed and as a result a signal $\{Y_n'\}$ as shown in FIG. 5 (D) is obtained.

On the other hand, in the reference waveform generating circuit 18, is generated a signal having reference waveform as shown in FIG. 5 (E), that is, a reference signal $\{\gamma n\}$ of which the phase is in synchronization with the position of the peak of the signal $p$. Such reference signal $\{\gamma n\}$ and the signal $\{Y_n'\}$ from the arithmetic mean processing circuit 15 are supplied to a subtracter 17 whereupon the signal $\{\gamma n\}$ is subtracted from the signal $\{Y_n'\}$, thereby obtaining a waveform distortion signal $\{en\}$ as shown in FIG. 5 (F). Further, the waveform distortion signal $\{\epsilon n\}$ is fed to both of the variable amplifier 361 and a criterion function setting circuit 19. The signal $\{\epsilon n\}$ coming into the variable amplifier 361 is multiplied by an appropriate factor $\alpha$ ($<1$) to form a modified signal $\{\epsilon n'\}(=\alpha\epsilon n\})$ shown in FIG. 5 (G), which is outputted to a weight setting circuit 12.

In this weight setting circuit 12, is detected from the inputted waveform distortion signal $\{\epsilon n'\}$ the distance in time between the peak of the modified waveform distortion signal and that of the reference signal $\rho$, as well as the ratio of the amplitude of the former signal to that of the latter signal. Then, the weight setting circuit 12 calculates the values of the weights $\{\omega n\}$ (see FIG. 5 (H) in such a manner to minimize the waveform distortion such as a ghost and further sets the value of each of the weights in a corresponding one of the weighting circuits 31 and 32. The calculation and setting of the values of the weights are repeatedly performed on the basis of the following equation.

$$\{\omega n\}_k = \{\omega n\}_{k-1} - \{\epsilon n'\}_k \quad (B1)$$

where $\{\omega n\}_k$ represents the values of the weights calculated k'th time (see FIG. 5 (H) which are set in corresponding taps of transversal filters composing the filtering portion 11.

Next, a system for processing the criterion function, which is one of the primary features of the present invention, will be described hereinafter. The waveform distortion signal $\{\epsilon n\}$ supplied from the subtracter 17 to the criterion function setting circuit 19 is used to obtain the following mean square value of Ne data of a section Te shown in FIG. 5 (F), which is really used for setting the weights, of the waveform distortion detecting interval Td as the criterion function.

$$E = \Sigma_{n-1}^{Ne} \epsilon n^2 / Ne \quad (B2)$$

This criterion function setting circuit 19 may comprise a multiplier for calculating the square, a feedback circuit including a latch circuit for generating delay of one clock interval in a loop and so on. The value of the criterion function E calculated herein is supplied to a comparator 20 of the next stage and is compared with a minimum value Emin stored in a minimum value storing circuit 28. Further, in the comparator 20, a value of $\beta$ Emin obtained by multiplying the minimum value Emin by a constant value $\beta$ greater than 1 is compared with a value of the criterion function. Then, a value of an amplification factor $\alpha$ ($<1$) corresponding to the value Emin is set the variable amplifier 361 by an amplification factor setting circuit 29 after it is confirmed that the following condition is satisfied.

$$E \leq \beta Emin (\beta < 1) \quad (B3)$$

Incidentally, the values of $\alpha$ are preliminarily stored in a read-only memory. Moreover, the signal $\{\epsilon n'\}$ is obtained by amplifying the input waveform distortion signal $\{\epsilon n\}$ by $\alpha$ times. This minimum value storing circuit 28 is composed of a latch circuit which stores the value of the criterion function at the time of termination of a pulse-like confirmation signal applied from the comparator 20 and replaces the current minimum value of the criterion function E obtained in the processing by that time with the value Emin.

FIG. 7 is a graph for showing a characteristic of an example of the criterion function employed in the criterion function setting circuit composing the ghost canceller according to the present invention. In this graph, abscissas represent the number k of times of repeatedly performing the processing of updating the value of the criterion function E. Further, black dots represent the values of the criterion function E; a dashed line a locus of the value Emin; and a one-dot chain line the values of the term $\beta$ Emin (in this case, $\beta$ is nearly equal to 1.5). As is seen from this figure, an initial value of Emin established in case where $k=0$ and succeedingly obtained values of Emin in case where k varies from 1 to 7 satisfy the condition that the value of the function E is less than the value Emin. That is, the value of Emin is updated every repetition of the processing until k reaches 7. Thus, in case where k is in the range of 0 to 7, the segments connecting black dots overlap with the dashed line. Further, as can be seen from this figure, the value of Emin is not updated in case where k is in the range of 8 to 20 in which that of Emin is stable.

As described above, the amplification factor $\alpha$ of the variable amplifier 361 is set in the amplification factor setting circuit 29. However, the amplification factor setting circuit 29 is adapted to effectively set the effective amplification factor $\alpha$ can be established only when the value of the function E is equal to or less tan that of the term $\beta$ Emin (see FIG. 7). In contrast, when the value of the function E is larger than the term $\beta$ Emin, that is, k equals to, for example, 11, 12, 16 or 17, the value of the amplification factor $\alpha$ is 0 so that the values of the weights $\{\omega n\}$ cannot be updated. Thus, the amplification factor setting circuit 29 has also a switching function. By performing the processing of updating the values of the weights $\{\omega n\}$ on the basis of the value of the criterion function E, it has become that there occur no troubles liable to occur in the prior art device, for instance, convergence of the estimated weights to erroneous stable values or divergence of the estimated weights due to the mixing of a noise or an extraordinary signal into the device and that the device is continuously controlled to make the estimated weights converge to true stable values, thereby stabilizing and ensuring an operation of cancelling waveform distortion such as a ghost.

Figure 8:
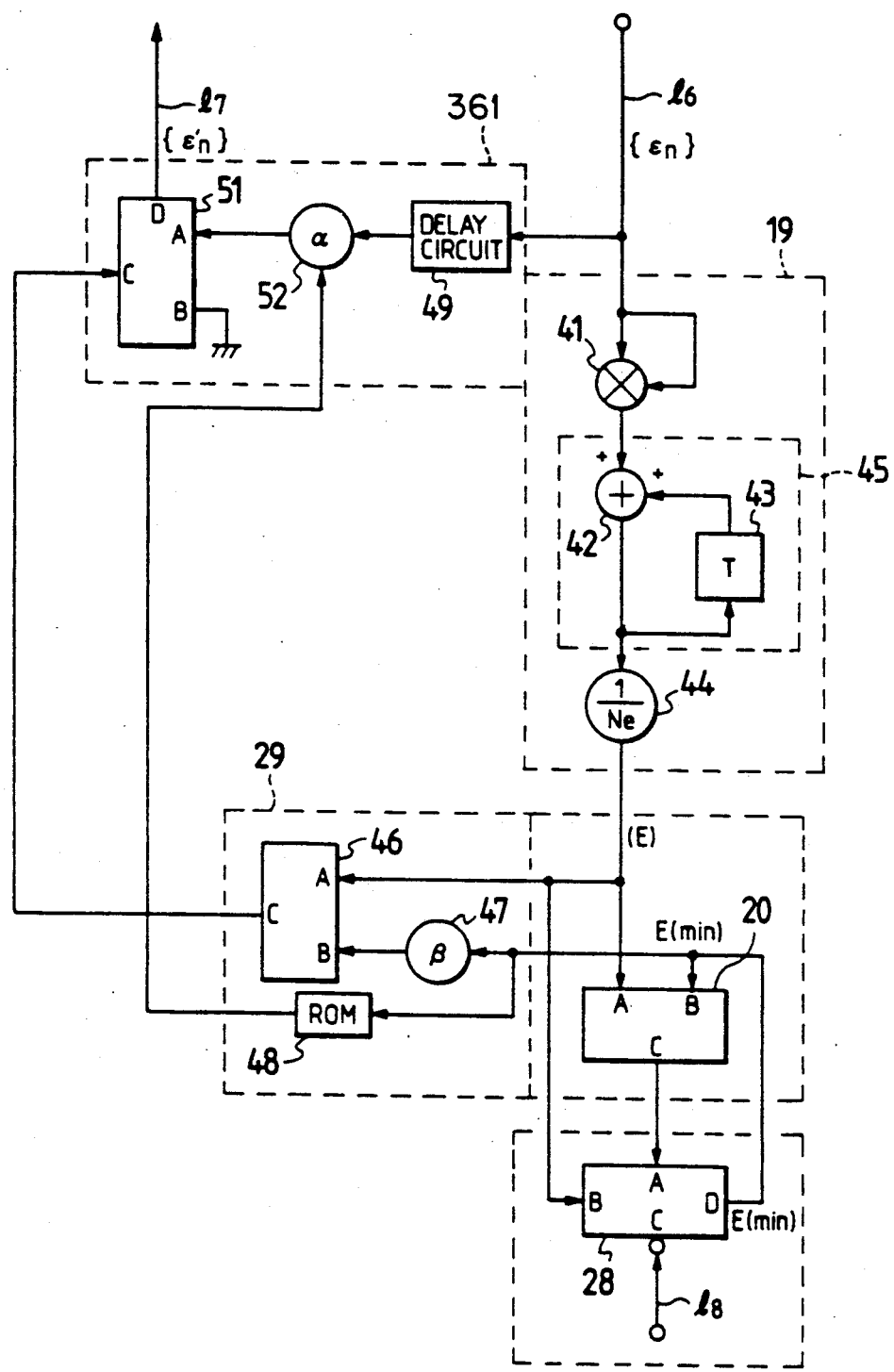
FIG. 8 is a schematic block diagram for showing the detailed configuration of the primary portion of the ghost canceller of the present invention shown in FIG. 1.

Turning now to FIG. 8, there is shown the detailed circuits composing the primary portion of the ghost cancelling device according to the first aspect of the present invention, that is, the detailed construction of the criterion function setting circuit 19, the comparator 20, the minimum value storing circuit 28, the amplification factor setting circuit 29 and the variable amplifier 361. As shown in this figure, the variable amplifier 361 comprises a delay circuit 49, a switching circuit 51 and an amplifier 52. Further, the criterion function setting circuit 19 includes a multiplier 41, an adder 42, a delay circuit 43 and an attenuator 44 connected in the manner as shown in this figure. Furthermore, the amplification factor setting circuit 29 comprises a comparator 46, and an amplifier 47 and a read-only memory 48.

First, the waveform distortion signal $\{\epsilon n\}$ supplied from the adder 17 through a line $l_0$ is delayed by a predetermined delay time, which is required for the processing of signals in the portion from the criterion function setting circuit 19 to the amplification factor setting circuit 29, in the delay circuit 49 composing the variable amplifier 361. Further, the waveform distortion signal $\{\epsilon n\}$ is amplified in the amplifier 52 by $\alpha$ times and thereafter inputted into a terminal A of the switching circuit 51. Then, the switching circuit 51 selects either the signal $\{\alpha\epsilon n\}$ (that is, the signal $\{\epsilon n'\}$) fed from the amplifier 52 or a potential of 0 fed to a terminal B on the basis of control signals supplied from the comparator 46 to a terminal C thereof and outputs the selected one of them from a terminal D. That is, the switching circuit 51 supplies the waveform distortion signal $\{\epsilon n\}$ or the potential of 0 to the weight setting circuit 12 by way of a line $l_7$.

On the other hand, the waveform distortion signal $\{\epsilon n\}$ coming from the adder 17 is supplied to the multiplier 41 composing the criterion function setting circuit. In the multiplier 41, waveform distortion square signal $\{\epsilon n^2\}$ is generated. The integrated value of the waveform distortion square signal $\{\epsilon n^2\}$ in the waveform distortion detecting interval Td is obtained by an integrating or accumulating circuit 45 composed of the adder 42 and the delay circuit 43 provided in a feedback loop, which has a delay time T equal to one clock interval (that is, equal to $\frac{1}{4} f_{sc}$ ($f_{sc}$ equals to 3.58 MHz)) in the adder 42. This integrated value is compressed into a reciprocal number (1/Ne) of the number Ne of integrated data in the attenuator 44 of the next stage. The thus obtained value of the criterion function E is given by the above described equation (B2).

$$E = \Sigma_{n-1}^{Ne} \epsilon n^2 / Ne \qquad (B4)$$

Incidentally, the descriptions of the timing of initiating an operation of, that of initialization of and that of terminating the operation of the integrating circuit 45 are omitted herein for convenience of explanation. The signals representing the value of the criterion function E are supplied to terminals A of both of the comparators 20 and 46. The comparator 46 compares the value of the criterion function E with the minimum value of the above described term $\beta$ Emin obtained by increasing the minimum value Emin of the criterion function E by a factor of $\beta$ (which is greater than 1) by the amplifier 47 and thereafter supplied to the terminal B. Furthermore, the comparator 46 operates to supply control signals for causing the switching circuit 51 to pass the signal inputted into the terminal A therethrough to the terminal D only in case where $E \leq \beta$ Emin and on the other hand pass the potential of 0 present at the terminal B therethrough to the terminal D only in case where $E > \beta$ Emin. Meanwhile, the comparator 20 compares the value of the criterion function E supplied from the attenuator 44 to the terminal A thereof with the minimum value Emin of the criterion function E supplied from the minimum value storing circuit 28 to the terminal B thereof and further operates to output a pulse-like control signal from the terminal C thereof, only in case where the condition that E < Emin is satisfied, representing such a condition. Incidentally, the minimum value storing circuit 28 is a latch circuit having what is called a preset terminal. The terminal C thereof is a preset input terminal into which a preset pulse supplied from a line $l_8$ is supplied as an initially established value simultaneously with the time of initiating a ghost cancelling operation of a ghost canceller and set the maximum value at the output terminal D as an initial value of Emin. The terminal B is a terminal to be used for inputting data and on the other hand the terminal A is a terminal to be used for inputting clock signals. At the time of termination of the clock pulse signal which is applied from the comparator 20 to the terminal A only when the condition E < Emin is satisfied, the value of the criterion function E supplied from the terminal B thereof is taken into the minimum value storing circuit as a new value of Emin, that is, the current value of Emin is replaced with the new value thereof. The thus obtained output Emin of the terminal D is supplied to both of the comparator 20, the amplifier 47 and the read-only memory 48. The read-only memory 48 outputs, to the amplifier 52, the amplification factor $\alpha$ thereof in correspondence to the minimum value Emin. Thus, the device of the present invention is intended to stabilize an operation thereof by using the criterion function E as a parameter and exerting control over the criterion function E in such a manner to continuously decrease.

Incidentally, in the foregoing embodiment, the square of the waveform distortion signal is used as the criterion function. The criterion function, however, is not limited thereto. The same effects can be obtained by using, for example, a mean absolute value of the waveform distortion function as a criterion function as follows.

$$E = \Sigma_{n-1}^{Ne} |\epsilon n| / Ne \qquad (B5)$$

Further, the reference signal to be used for detection of the waveform distortion is not limited to the signal having the pulse-like waveform established in the center of the horizontal scanning interval as shown in FIG. 5 (A). For instance, pulse signals extracted by some waveform conversion such as a trailing edge or falling edge of the waveform of the signal as shown in FIG. 5 (K) for displaying a bar, a waveform obtained by differentiating a leading edge portion of the vertical synchronization signal and so on can be available as the reference signal in the device of the present invention.

Next, another preferred embodiment, that is, a second embodiment of the present invention will be described hereinafter by referring to the accompanying drawings.

Before explaining the detail of the second embodiment of the present invention, it is to be noted that this ghost canceller according to the second aspect of the present invention performs a ghost cancelling operation not simply by sequentially modifying the weights applied to taps of the transversal filters of the filtering portion but further by introducing a criterion function for evaluating quantity of the waveform distortion component, the accumulated and averaged value of the waveform distortion signal and the already established weights thereinto as parameters to be used for setting the weights and then sequentially effecting a weighting operation under condition that the value of the criterion function is to decrease, whereby the ghost cancelling operation is stably performed.

Further, the second embodiment of the present invention will be explained hereunder by referring to the accompanying drawings.

Figure 9:
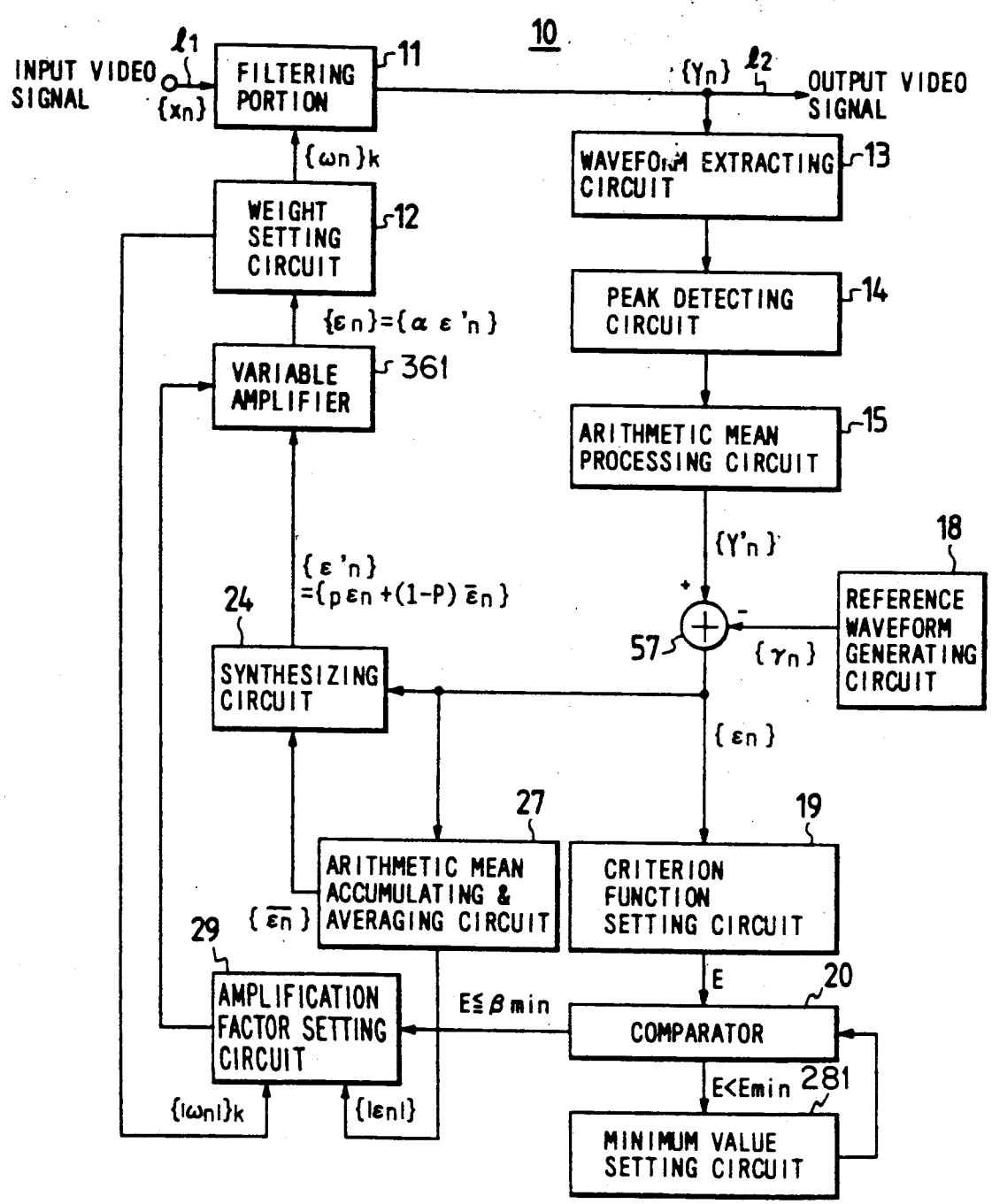
FIG. 9 is a schematic block diagram for showing the configuration of a second ghost canceller of the present invention.

Referring now to FIG. 9, there is shown a second ghost canceller 10 embodying the present invention. In this figure, like reference characters refer to like or corresponding portions of the prior art device shown in FIG. 2 (A). Thus, the detail descriptions of such portions of the second embodiment will be also omitted. As can be easily understood from a comparison between FIGS. 9 and 2, the primary characteristic aspect of this ghost canceller 10 according to the present invention resides in that a variable amplifier 361 is provided in place of the amplifier 36 of the conventional device 1, that the amplification factor of the amplifier 361 is adapted to be controlled by an external circuit, these criterion function setting circuit 19 is introduced thereinto to exert control over the criterion function in such a manner to cause the criterion function to decrease and that the accumulated and averaged value of the quantity represented by the waveform distortion signal is obtained by performing arithmetic mean accumulating and averaging processing of the values indicated by the waveform distortion signals with the passage of time and the level of the accumulated and averaged value of the waveform distortion signals is mixed into the current waveform distortion signal at an appropriate ratio and in addition a weighting circuit 12 is adapted to operate with reference to data only in case where the already established weights and the accumulated and averaged value are significant. In order to implement such an operation thereof, the second ghost canceller is provided with an arithmetic mean accumulating and averaging circuit 27 and a synthesizing circuit 24 in addition to a comparator 20, a minimum value storing circuit 28, an amplification factor setting circuit 29, the variable amplifier 361 and the criterion function setting circuit 19, which are connected with each other as shown in FIG. 9.

Next, an operation of this ghost canceller 10 according to the second aspect of the present invention will be described by referring to the waveform diagram shown in FIG. 5. NTSC digital video signals $\{X_n\}$ used in a television (TV) system conforming to standards adopted by the NTSC, which are supplied from a line $l_1$ to a filtering portion 11, are taken out as output video signals $\{Y_n\}$ from a line $l_2$ without being changed. The output signal $\{Y_n\}$ represents a horizontal scanning interval in which a reference signal used for detecting waveform distortion such as a ghost superposed on a portion of a video signal corresponding to a vertical retrace interval is present. Similarly as in case of the first embodiment, a detection period Td in this output signal for detecting waveform distortion such as a ghost is extracted by a waveform extracting circuit 13 (see FIGS. 5 (B) and (C)).

Further, the waveform extracting circuit 13 has a clamping function of clamping an electric potential and operates to detect an electric potential at a time PK, which is shown in FIG. 5 (B) directly before a reference signal $p$ shown in FIG. 5 (B) occurs, and shifts the DC level of the output signal in such a manner to change the level of the detected potential into 0. Furthermore, the position of a peak of the reference signal $p$ in the waveform of an output signal of the waveform extracting circuit 13 is detected by a peak detecting circuit 14. Thereafter, an output signal of the peak detecting circuit 14 is fed to an arithmetic mean processing circuit 15 of the next stage, whereupon the outputs of the peak detecting circuit 14 are added a predetermined number of times and then averaged on the basis of the position of the peak. Further, the noise component shown in FIG. 5 (D) having no correlation with the signal is sufficiently suppressed by the adding and averaging processing and thus a signal $\{Y_n'\}$ as shown in FIG. 5 (D) is obtained.

On the other hand, in the reference waveform generating circuit 18, is generated a signal having reference waveform as shown in FIG. 5 (E), that is, a reference signal $\{\gamma n\}$ of which the phase is in synchronization with the position of the peak of the signal $p$. Such reference signal $\{\gamma n\}$ and the signal $\{Y_n'\}$ from the arithmetic mean processing circuit 15 are supplied to a subtracter 57 whereupon the signal $\{\gamma n\}$ is subtracted from the signal $\{Y_n'\}$, thereby obtaining a waveform distortion signal $\{\epsilon n\}$ as shown in FIG. 5 (F). Further, the waveform distortion signals $\{\epsilon n\}$ are supplied to the criterion function circuit 19, the arithmetic mean accumulating and averaging circuit 27 and the synthetic circuit 24. The arithmetic mean accumulating and averaging circuit 27 includes storage circuits for a portion of the signal corresponding to a waveform distortion detecting interval Td and adders and operates to serially add the values represented by the coming waveform distortion signals $\{\epsilon n\}$ from the peak thereof which is employed as a reference point of time and further outputs signals $\{\overline{\epsilon n}\}$ representing the value obtained by effecting arithmetic mean accumulating and averaging processing of the values represented by the waveform distortion signals as shown in FIG. 5 (I). The synthesizing circuit 24 synthesizes or forms a signal $\{\epsilon n'\}$ by bringing together the waveform distortion signal $\{\epsilon n\}$ outputted from the subtractor 57 and the accumulated waveform distortion signal $\{\overline{\epsilon n}\}$ outputted from the arithmetic mean accumulating and averaging circuit 27 using the following equation $$\{\epsilon n'\} = \{p\epsilon n + (1-p)\overline{\epsilon n}\} \tag{B6}$$

where p denotes a constant. The thus synthesized signal $\{\epsilon n'\}$ is multiplied by a predetermined factor $\alpha$ ($<1$) in the variable amplifier 361 to form a signal $\{\epsilon n''\}(=\{\alpha\epsilon n'\})$ shown in FIG. 5 (J), which is outputted to a weight setting circuit 12.

In this weight setting circuit 12, is detected from the inputted waveform distortion signal $\{\epsilon n''\}$ the distance in time between the peak of the modified waveform distortion signal and that of the reference signal $p$, as well as the ratio of the amplitude of the former signal to that of the latter signal. Then, the weight setting circuit 12 calculates the values of the weights in such a manner to reduce the waveform distortion such as a ghost and further operates to set the value of each of the weights in a corresponding one of the weighting circuits 31 and 32 of weighting blocks 37 and 38 of the filtering portion 11. The calculation and setting of the values of the weights are repeatedly performed on the basis of the following equation.

$$\{\omega n\}_k = \{\omega n\}_{k-1} - \{\epsilon n''\}_k \tag{B7}$$

where $\{\omega n\}_k$ represents the value of the weight calculated k'th time (see FIG. 5 (H)) which is set in a corresponding tap of FIR filters 21 and 23 composing the filtering portion 11.

Next, a system for processing the criterion function, which is one of the primary features of the present invention and is similar to the corresponding system of the first embodiment, will be described hereinbelow. The waveform distortion signal $\{\epsilon n\}$ supplied from the subtracter 57 to the criterion function setting circuit 19 is used to obtain the following mean square value of Ne data of a section Te shown in FIG. 5 (F), which is really used for setting the weights, of the waveform distortion detecting interval Td as the criterion function.

$$E = \Sigma_{n=1}^{Ne} \epsilon n^2 / Ne \tag{B8}$$

Incidentally, the expression $\Sigma_{n=1}^{Ne}$ is used in this specification to indicate $$\sum_{n=1}^{Ne}.$$

This criterion function setting circuit 19 can comprise a multiplier for calculating the mean square, a feedback circuit including a latch circuit for generating delay of one clock interval in a loop and so on. The value of the criterion function E obtained herein is supplied to a comparator 20 of the next stage and is compared with a minimum value Emin thereof outputted from a minimum value storing circuit 28. Further, in the comparator 20, a value of $\beta$ Emin obtained by multiplying the minimum value Emin by a constant value $\beta$ greater than 1 is compared with a value of the criterion function. Furthermore, a value of the amplification factor $\alpha$ ($<1$) corresponding to the value Emin is set in an amplification factor setting circuit 29 after it is confirmed that the condition given by the equation (B9) is satisfied $$E \leq \beta Emin (\beta < 1) \qquad (B9)$$

The amplification factor $\alpha$ is set as that of the variable amplifier 16. Moreover, the signal $\{\epsilon n''\}$ is obtained by amplifying the input waveform distortion signal $\{\epsilon n'\}$ by $\alpha$ times. That is, the signal $\{\epsilon n''\}$ is obtained as a signal $\{\alpha \epsilon n'\}$. To this amplification factor setting circuit 29, the value represented by the waveform distortion arithmetic mean accumulating and averaging signal $\{\overline{\epsilon n}\}$ and the already established weights $\{\omega n\}_k$ are supplied. Further, only when these values $\{\overline{\epsilon n}\}$ and $\{\omega n\}_k$ are significant in comparison with the already set value thereof, the value of the amplification factor $\alpha$ is maintained. In other cases, the amplification factor $\alpha$ is set as 0. Thus, the amplification factor setting circuit 29 operates to control and cause the waveform distortion signal $\{\epsilon n'\}$ not to pass the variable amplifier 361. Therefore, the amplification factor setting circuit 29 acts as a switch.

On the other hand, the comparator 20 compares the value of the criterion function E represented by the signal supplied from the criterion function setting circuit 19 with the minimum value Emin indicated by the signal fed from the minimum value storing circuit 28 which replaces the current minimum value Emin already established therein with the value of the criterion function E as a new minimum value Emin in case where the current value of the criterion function E is less than the current minimum value Emin. This minimum value storing circuit 28 is composed of a latch circuit which stores the value of the criterion function at the time of termination of a pulse-like confirmation signal applied from the comparator 20 in case where the value of the function E is less than the current minimum value Emin.

A characteristic of an example of the criterion function employed in the criterion function setting circuit 19 composing the ghost canceller according to the second aspect of the present invention is also shown in a graph of FIG. 7. In this graph, abscissas represent the number k of times of repeatedly performing the processing of updating the value of the criterion function E as described above. Further, black dots represent the values of the criterion function E; a dashed line a locus of the value Emin; and a one-dot chain line the values of the term $\beta$ Emin (in this case, $\beta$ is approximately 1.5). In this figure, an initial value of Emin established in case where k=0 and succeedingly obtained values of Emin in case where k varies from 1 to 7 satisfy the condition that the value of the function E is smaller than the value Emin. Namely, the value of Emin is updated every repetition of the processing until k reaches 7. Therefore, in case where k is in the range of 0 to 7, the segments connecting black dots overlap with the dashed line. Further, as can be seen from this figure, the value of Emin is not updated in case where k is in the range of 8 to 20 in which that of Emin is stable. Incidentally, the characteristic of the term $\beta$ Emin is obtained by multiplying the minimum value Emin by a constant $\beta$.

The amplification factor $\alpha$ of the variable amplifier 361 is set in the amplification factor setting circuit 29. However, the amplification factor setting circuit 29 is adapted to effectively set the effective amplification factor $\alpha$ can be established only when the value of the function E is equal to or less than that of the term $\beta$ Emin (see FIG. 7) and in addition the value represented by the signal $\{\overline{\epsilon n}\}$ and the already established values of the weights $\{\omega n\}_k$ are significant (that is, $|\overline{\epsilon n}| > Pa$, $|\omega n| > Pb$ where Pa and Pb are positive constants). In contrast, when the value of the function E is larger than the term $\beta$ Emin, that is, k equals to, for example, 11, 12, 16 or 17, the value of the amplification factor $\alpha$ is 0 and further the values of the weights $\{\omega n\}$ cannot be updated. Thus, the amplification factor setting circuit 29 has a switching function. By updating the values of the weights $\{\omega n\}$ on the basis of the value of the criterion function E, it has become that in this embodiment, there occur no troubles liable to occur in the prior art device, for instance, convergence of the estimated weight to an erroneous stable value or divergence of the estimated weight due to the mixing of a noise or an extraordinary signal into the device and that the device is continually controlled to cause the estimated weight converge to a true stable value, thereby stabilizing and ensuring an operation of cancelling waveform distortion such as a ghost.

Figure 10:
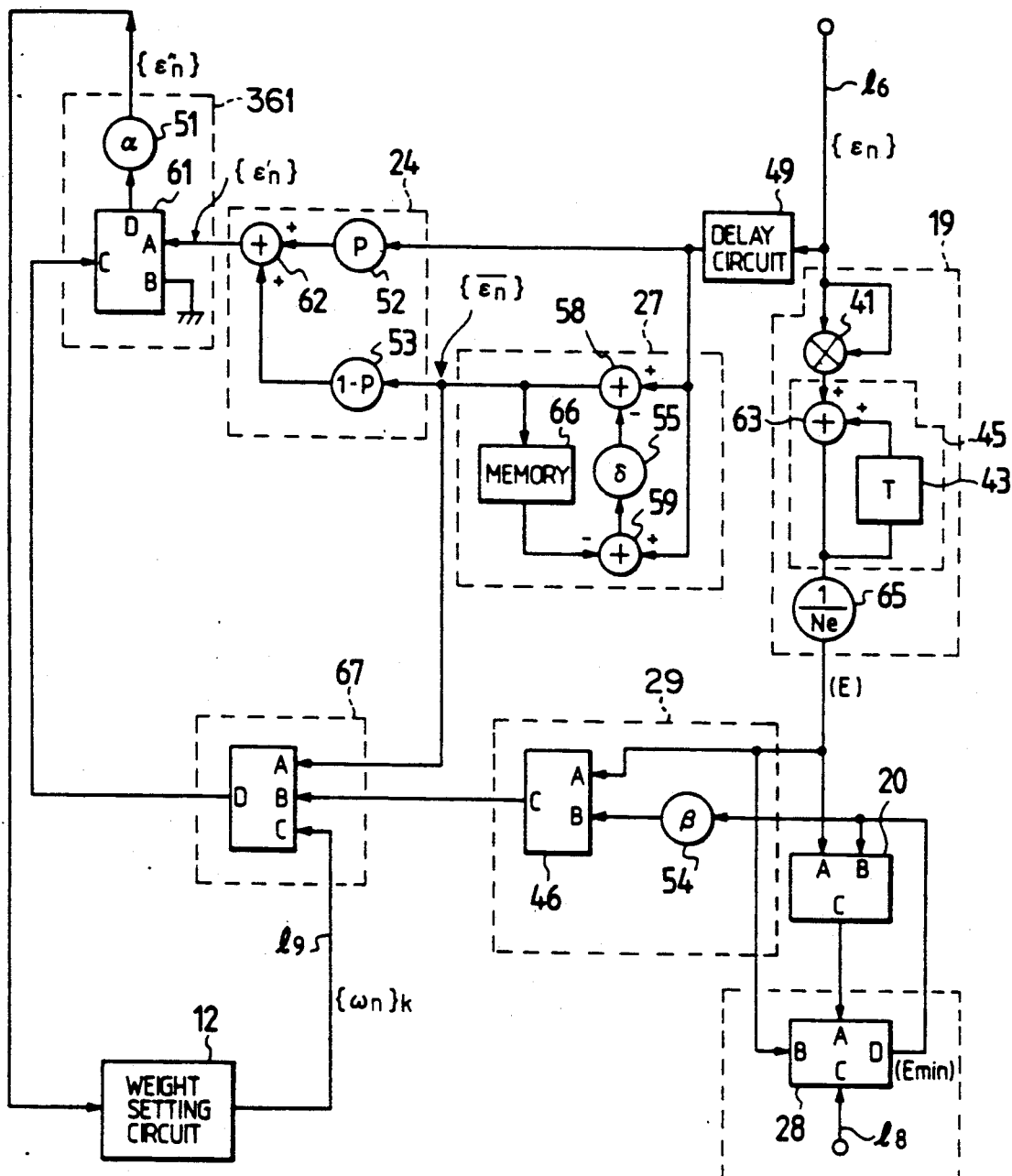
FIG. 10 is a schematic block diagram for showing the detailed configuration of the primary portion of the ghost canceller of the present invention shown in FIG. 9.

Further, referring to FIG. 10, there is shown the detailed circuits composing the primary portion of the ghost cancelling device according to the second aspect of the present invention, that is, the detailed construction of the variable amplifier 361, the criterion function setting circuit 19, the comparator 20, the synthesizing circuit 24, the arithmetic mean accumulating and averaging circuit 27, the minimum value storing circuit 28 and the amplification factor setting circuit 29 and so on. Hereinafter, an operation of the device will be described by referring to this figure.

First, the waveform distortion signal $\{\epsilon n\}$ supplied from the subtractor 57 through a line $l_o$ is delayed by a predetermined delay time, which is required for the processing of signals in the portion from the criterion function setting circuit 19 to the amplification factor setting circuit 29, in the delay circuit 49. Further, the waveform distortion signal $\{\epsilon n\}$ is amplified in an amplifier 52 by p times and is thereafter supplied to the adder 62 whereupon the output signal $\{\overline{\epsilon n}\}$ of the arithmetic mean accumulating and averaging circuit 27 amplified by (1−p) times by an amplifier 53 is added to the thus amplified signal $\{p \epsilon n\}$ so as to form a signal $\{\epsilon n'\}$ ($=\{p \epsilon+(1-p)\overline{\epsilon n}\}$ which is further inputted into a terminal A of a data selector 61 composing the variable amplifier 361. Then, this data selector 61 selects either of the signal $\{\epsilon n\}$ (that is, the signal $\{\epsilon n'\}$) inputted into the terminal A thereof and a potential of 0 fed to a terminal B thereof on the basis of control signals supplied to a terminal C thereof and outputs the selected one of them from a terminal D. Further, an amplifier 51, of which the gain is α, transfers the output signal {εn″} (={αεn′}) to the weight setting circuit 12 in case where the signal {εn′} is supplied.

On the other hand, the signal {εn} outputted from the delay circuit 49 is also supplied to the arithmetic mean accumulating and averaging circuit 27. A subtracter 58 composing the arithmetic mean accumulating and averaging circuit 27 subtracts an output signal of an amplifier 55 from the input signal {εn} and stores the result of the subtraction in a memory or storage portion 66 and outputs the resulting signal to both of the amplifier 53 and a signal processing circuit 67. Further, the memory 66 has a capacity sufficient to store data of the waveform distortion detecting interval Td and operates to repeat operations of reading and writing data every time the data of the interval Td corresponding to each field or frame are taken thereinto. The output of this memory 66 is supplied to a subtracter 59 whereupon the output {εn} of the delay circuit 49 is subtracted from the output of the memory 66. Thereafter, the output of the subtracter 59 is amplified by δ times (that is, the gain of the amplifier 55 is δ) by the amplifier 55 of the next stage and is then outputted to the subtracter 58. The thus constructed accumulating and averaging circuit 27 inherently serves as a noise reducing circuit and further operates to obtain the signal $\{\overline{\varepsilon n}\}$ representing the accumulated and averaged value of the quantity indicated by the waveform distortion signal {εn}. This output signal $\{\overline{\varepsilon n}\}$ is supplied to the amplifier 53 and to the terminal A of the signal processing circuit 67.

To the terminal C of the signal processing circuit 67, the established values of the weights $\{\omega n\}_k$ are supplied from the weight setting circuit 12 through a line $l_0$. On the other hand, to the terminal B of the circuit 67, a signal indicating the information "High" (hereunder abbreviated to "H") Level is inputted in case where the above described condition relating to the criterion function that E≦βEmin is satisfied. In case where not satisfied, a signal indicating the information "Low" (hereunder abbreviated to "L") Level is inputted to the terminal B of the signal processing circuit 67. This signal processing circuit 67 may be a comparator and constructed in such a manner to output a signal indicating "H" Level only when the values indicated by the signals at the terminals A and B are significant and that of the signal at the terminal C indicates "H" and to output another signal indicating "L" Level in the other cases.

On the other hand, the waveform distortion signal {εn} coming from the subtracter 57 is supplied through a line $l_6$ to a multiplier 41, in which the waveform distortion square signal {εn²} is produced, composing the criterion function setting circuit 19. Further, the integrated value of the waveform distortion square signal {εn²} in the waveform distortion detecting interval Td is obtained by an integrating or accumulating circuit 45 composed of the adder 63 and a delay circuit 43 provided in a feedback loop, which circuit delays the waveform distortion square signal by a delay time T equal to one clock interval (that is, equal to $\frac{1}{4}f_{sc}$ ($f_{sc}$ equals to 3.58 MHz)) of the next stage. This integrated value is compressed into a reciprocal number (1/Ne) of the number Ne of integrated data in an attenuator 65 of the next stage and then an arithmetic mean is obtained. The thus obtained value of the criterion function E is also given by the equation (B4), that is, $$E = \Sigma_{n-1}^{Ne} \varepsilon n^2 / Ne$$

Incidentally, the descriptions of the timing of initiating an operation of, that of initialization of and that of terminating the operation of the integrating circuit 45 are omitted herein for convenience of explanation as in case of the first embodiment of the present invention. The signals representing the value of the criterion function E are supplied to terminals A of the comparators 20 and 46. Further, the comparator 46 compares the value of the criterion function E with the minimum value of the above described term β Emin obtained by increasing the minimum value Emin of the criterion function E by a factor of β (which is greater than 1) by an amplifier 54 and thereafter supplied to the terminal B. Furthermore, the comparator 46 operates to transfer a signals representing "H" Level only in case where E≦β Emin and on the other hand transfer a signal indicating "L" Level from the terminal C thereof to the terminal B of the signal processing circuit 67 in the other cases. The signal representing the result of the comparison is set at the terminal C of the comparator C after the criterion function E is formed by integrating processing so that the criterion function E is updated every field or frame.

Next, the comparator 20 compares the value of the criterion function E supplied from the attenuator 65 to the terminal A thereof with the minimum value Emin of the criterion function E supplied from the terminal D of the minimum value storing circuit 28 to the terminal B thereof and moreover operates to output a pulse-like control signal from the terminal C thereof, only in case that the condition that E< Emin is satisfied, representing such a condition. Incidentally, the minimum value storing circuit 28 is a latch circuit having what is called a preset terminal, as in case of the first embodiment of the present invention. The terminal C thereof is a preset input terminal into which a preset pulse fed from a line $l_8$ is supplied as an initially established value simultaneously with the time of initiating an ghost cancelling operation of a ghost canceller and set the maximum value at the output terminal D as an initial value of Emin. Furthermore, the terminal B is used for inputting data and on the other hand the terminal A is used for inputting clock signals. At the time of termination of the clock pulse signal which is applied from the comparator 20 to the terminal A only when the condition E<Emin is satisfied, the value of the criterion function E supplied from the terminal B thereof is taken into the minimum value storing circuit 28 as a new value of Emin, that is, the current value of Emin is replaced with the new value thereof. The thus obtained output Emin of the terminal D is supplied to both of the comparator 20 and the amplifier 54. Thus, the device according to the second aspect of the present invention is also intended to stabilize an operation thereof by using the criterion function E as a parameter and exerting control over the criterion function E in such a manner to continuously decrease.

Further, in the second embodiment of the present invention, the square of the waveform distortion signal is used as the criterion function. Similarly, the criterion function is not limited thereto. The same effects can be obtained by using, for example, an absolute value of the waveform distortion function as a criterion function given by the equation (B5), that is, $$E = \Sigma_{n-1}^{Ne} |\varepsilon n| / Ne.$$

Furthermore, the reference signal to be used for detection of the waveform distortion is not limited to the signal having the pulse-like waveform set in the center of the horizontal scanning interval as shown in FIG. 5 (A). For instance, pulse signals extracted by some waveform conversion such as a trailing edge or falling edge of the waveform of the signal for displaying a bar as shown in FIG. 5 (K), a waveform obtained by differentiating a leading edge portion of the vertical synchronization signal and so on can be available as the reference signal to be used in algorithm for cancelling a ghost which is employed in the second embodiment of the present invention.

Next, still another preferred embodiment, that is, a third embodiment of the present invention will be described hereinbelow by referring to the accompanying drawings.

Before explaining the detail of the third embodiment of the present invention, it is to be noted that this ghost canceller according to the third aspect of the present invention performs a ghost cancelling operation not simply by sequentially modifying the weights applied to taps of the transversal filters of the filtering portion but further by introducing a criterion function for evaluating quantity of the waveform distortion component, the accumulated and averaged value of the waveform distortion signal and the already established weights thereinto as parameters to be used for setting the weights and then sequentially effecting a weighting operation under condition that the value of the criterion function is to decrease and moreover performing only when the accumulated and averaged value and the already established value of the weights are significant, whereby the ghost cancelling operation is stably performed.

Further, the third embodiment of the present invention will be explained hereunder by referring to the accompanying drawings.

Figure 11:
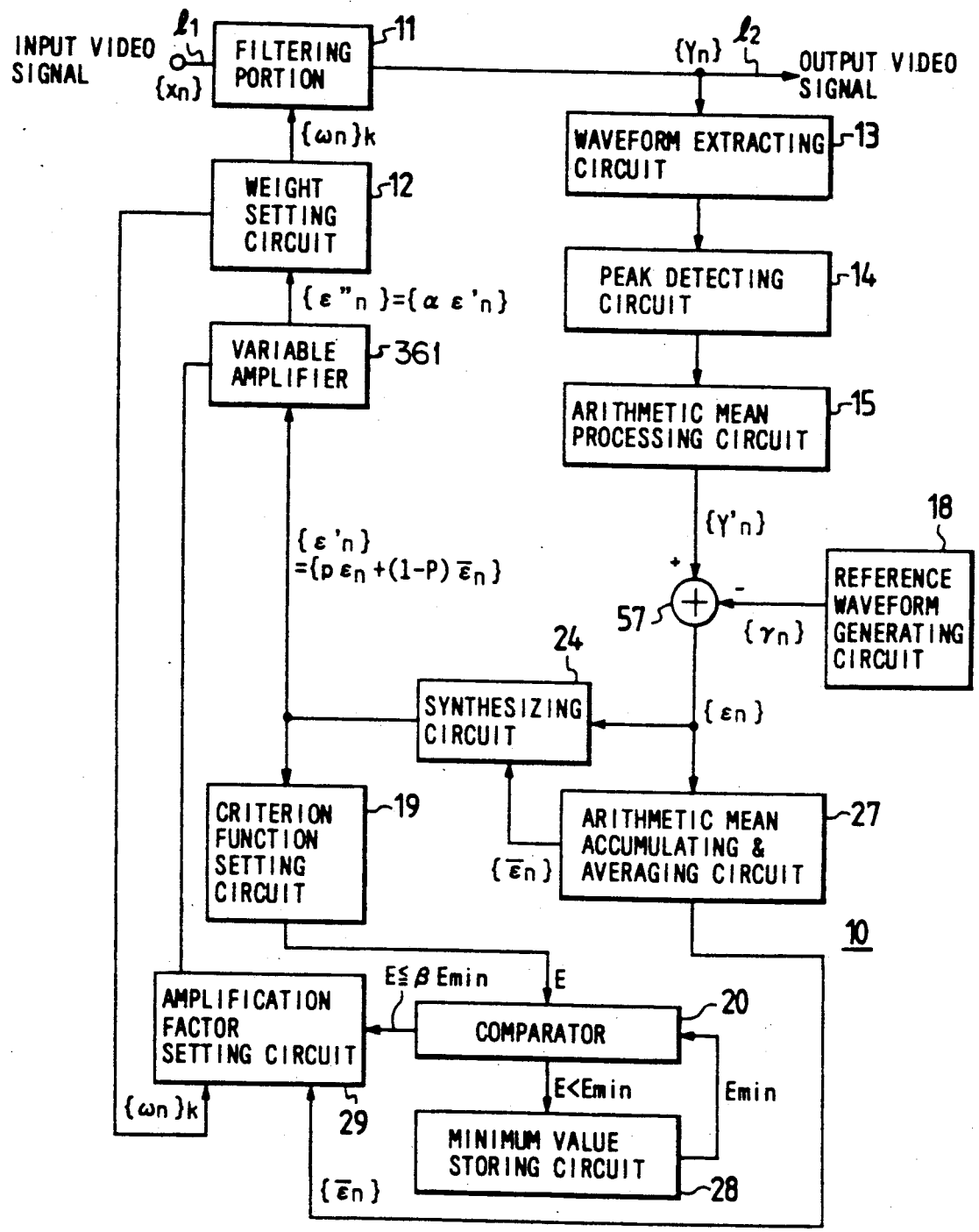
FIG. 11 is a schematic block diagram for showing the configuration of a third ghost canceller of the present invention.
Figure 12:
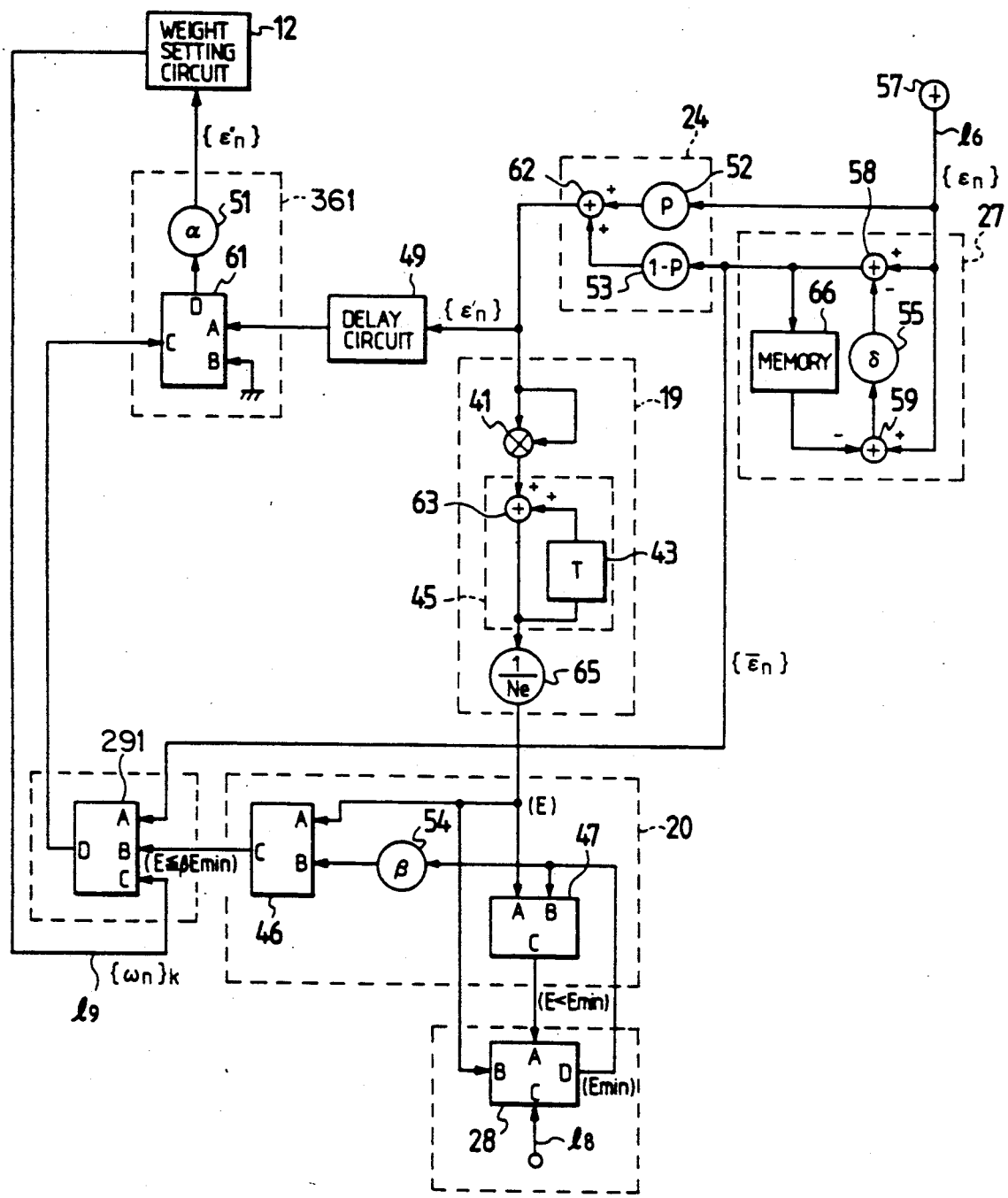
FIG. 12 is a schematic block diagram for showing the detailed configuration of the primary portion of the ghost canceller of the present invention shown in FIG. 11.

Referring now to FIG. 11, there is shown a third ghost canceller 10 embodying the present invention. In this figure, like reference characters refer to like or corresponding portions of the prior art device shown in FIG. 2(A). Thus, the detail descriptions of such portions of the third embodiment will be also omitted. As can be easily understood from a comparison between FIGS. 11 and 2, the primary characteristic aspects of this ghost canceller 10 according to the present invention resides in that a variable amplifier 361 is provided instead of the amplifier 36 of the conventional device 1, that the amplification factor of the amplifier 361 is adapted to be controlled by an external circuit, that a criterion function setting circuit 19 is introduced thereinto to exert control over the criterion function in such a manner to cause the criterion function to decrease and that the accumulated and averaged value of the quantity represented by the waveform distortion signal is obtained by performing arithmetic mean accumulating and averaging processing of the values indicated by the waveform distortion signals with the passage of time and further a signal indicating the level of the accumulated and averaged value of the waveform distortion signals is mixed into the current waveform distortion signal at an appropriate ratio and in addition a weighting circuit 12 is adapted to operate with reference to data only in case where the already established weights and the accumulated and averaged value are significant. In order to perform such an operation thereof, the third ghost canceller is provided with an arithmetic mean accumulating and averaging circuit 27 and a synthesizing circuit 24 in addition to a comparator 20, a minimum value storing circuit 28, an amplification factor setting circuit 29, the variable amplifier 361 and the criterion function setting circuit 19, which are connected with each other as shown in FIG. 11.

Next, an operation of this ghost canceller 10 according to the third aspect of the present invention is similar to the operation of the third embodiment of the present invention as described by referring to FIGS. 5 and 7. Thus, the detailed circuits, which are shown in FIG. 11 and are characteristic to the third embodiment of the present invention, for controlling the criterion function E will be described hereinafter.

Referring to FIG. 11, there is shown the detailed circuits composing the primary portion of the ghost cancelling device according to the third aspect of the present invention, that is, the detailed construction of the variable amplifier 361, the criterion function setting circuit 19, the comparator 20, the synthesizing circuit 24, the arithmetic mean accumulating and averaging circuit 27, the minimum value storing circuit 28 and the amplification factor setting circuit 29 and so on. Hereinafter, an operation of the device will be described by referring to this figure.

First, the waveform distortion signal $\{\epsilon n\}$ supplied form the subtractor 57 through a line $l_0$ is amplified in an amplifier 53 by p times and is thereafter supplied to an adder 62 whereupon the output signal $\{\overline{\epsilon n}\}$ of the arithmetic mean accumulating and averaging circuit 27 amplified by $(1-p)$ times by the amplifier 53 is added to the thus amplified signal $\{p\ \epsilon n\}$ so as to output a signal $\{\epsilon n'\}$ ($=\{p\ \epsilon+(1-p)\ \overline{\epsilon n}\}$).

Further, the output signal $\{\epsilon n\}$ is also supplied to a subtracter 58 composing the arithmetic mean accumulating and averaging circuit 27. The subtracter 58 subtracts the output of an amplifier 55 from the input signal $\{\epsilon n\}$ and stores the result of the subtraction in a memory (storage portion) 66 and further outputs the result to the amplifier 53 and to the amplification factor setting circuit 29. Further, the memory 66 has a capacity sufficient to store data of the waveform distortion detecting interval Td and operates to repeat operations of reading and writing data every time the data of the interval Td corresponding to each field or frame are taken thereinto. The output of this memory 66 is supplied to a subtracter 59 whereupon the output $\{\epsilon n\}$ of a delay circuit 49 is subtracted from the output of the memory 66. Thereafter, the output of the subtracter 59 is amplified by $\delta$ times (that is, the gain of the amplifier 55 is $\delta$) by the amplifier 55 of the next stage and is then outputted to the subtracter 58. The thus constructed accumulating and averaging circuit 27 inherently serves as a noise reducing circuit and further operates to obtain the signal $\{\epsilon n\}$ representing the accumulated and averaged value of the quantity indicated by the waveform distortion signal $\{\epsilon n\}$. This output signal $\{\overline{\epsilon n}\}$ is supplied to the amplifier 53 and to the terminal A of a signal processing circuit 67.

On the other hand, an output signal $\{\epsilon n'\}$ of the synthesizing circuit 49 is supplied to a delay 49 whereupon the output signal $\{\epsilon n'\}$ is delayed by a predetermined time to correct the delay time generated in the system for performing the criterion function processing (that is, the time required for the signal processing effected in the criterion function setting circuit 19, the comparator 20, the minimum value storing circuit 28 and the amplification factor setting circuit 29). Incidentally, the waveform of the input signal is not changed by delaying thereof and thus output signals are represented by the expression $\{\epsilon n'\}$ similarly as in case of the input signals.

The output of the delay circuit 49 is inputted to a terminal A of a data selector 61 composing the variable amplifier 361. Then, this data selector 61 selects either of the signal {εn} (that is, the signal {εn'}) inputted into the terminal A thereof and a potential of 0 fed to a terminal B thereof on the basis of control signals supplied to a terminal C thereof and outputs the selected one of them from a terminal D. Further, an amplifier 51, of which the gain is α, transfers the output signal {εn''}(={αεn'}) to the weight setting circuit 12 in case where the signal {εn'} is supplied.

Next, the criterion function will be described hereinbelow. The waveform distortion signal {εn'} coming from the synthesizing circuit 24 is supplied to the multiplier 41, in which the waveform distortion square signal {εn'$^2$} is produced, composing the criterion function setting circuit 19. Further, the integrated value of the waveform distortion square signal {εn'$^2$} in the waveform distortion detecting interval Td is obtained by an integrating or accumulating circuit 45 composed of an adder 63 and a delay circuit 43 provided in a feedback loop, which circuit delays the waveform distortion square signal by a delay time T equal to one clock interval (that is, equal to $\frac{1}{4}f_{sc}$ ($f_{sc}$ equals to 3.58 MHz)) of the next stage. This integrated value is compressed into a reciprocal number (1/Ne) of the number Ne of integrated data in an attenuator 65 of the next stage and then an arithmetic mean is obtained. The thus obtained value of the criterion function E is also given by the equation $E = \Sigma_{n=1}^{Ne} \epsilon n^2 / Ne.$ Incidentally, the descriptions of the timing of initiating an operation of, that of initialization of and that of terminating the operation of the integrating circuit 45 are omitted herein and will be omitted hereunder for convenience of explanation as in cases of the first and second embodiments of the present invention.

The signal representing the value of the thus obtained criterion function E is supplied to terminals A of the comparators 20 and a comparator 46. Further, the comparator 46 compares the value of the criterion function E with the minimum value of the above described term β Emin obtained by increasing the minimum value Emin of the criterion function E by a factor of β (which is greater than 1) by an amplifier 54 and thereafter supplied to the terminal B. Furthermore, the comparator 46 operates to transfer a signals representing "H" Level only in case where E≦β Emin and on the other hand transfer a signal indicating "L" Level from the terminal C thereof to the terminal B of the signal processing circuit 67 in the other cases. The output signal indicating the decision, that is, the signal representing the result of the comparison is set at the terminal C of the comparator 46 after the criterion function E is formed by integrating processing so that the criterion function E is updated every field or frame.

Further, a comparator 47 compares the value of the criterion function E supplied from the attenuator 65 to the terminal A thereof with the minimum value Emin of the criterion function E supplied from the terminal D of the minimum value storing circuit 28 to the terminal B thereof and moreover operates to output a pulse-like control signal from the terminal C thereof, only in case that the condition that E<Emin is satisfied, representing such a condition. Incidentally, the minimum value storing circuit 28 is a latch circuit having what is called a preset terminal, as in cases of the first and second embodiments of the present invention. The terminal C thereof is a preset input terminal into which a preset pulse fed from a line l$_8$ is supplied as an initially established value simultaneously with the time of initiating an ghost cancelling operation of a ghost canceller and set the maximum value at the output terminal D as a initial value of Emin. Furthermore, the terminal B is used for inputting data and on the other hand the terminal A is used for inputting clock signals. At the time of termination of the clock pulse signal which is applied from the comparator 20 to the terminal A only when the condition E<Emin is satisfied, the value of the criterion function E supplied from the terminal B thereof is taken into the minimum value storing circuit 28 as a new value of Emin, that is, the current value of Emin is replaced with the new value thereof. The thus obtained output Emin of the terminal D is supplied to both of the comparator 20 and the amplifier 54. Thus, the third embodiment of the present invention is also intended to stabilize an operation thereof by using the criterion function E as a parameter and exerting control over the criterion function E in such a manner to continuously decrease.

Next, functions and operations of the amplification factor setting circuit 29 will be described hereinbelow. To the terminal A of the amplification factor setting circuit 29, a signal representing the waveform distortion arithmetic mean accumulating and averaging value {$\overline{\epsilon n}$} from the arithmetic mean accumulating and averaging circuit 27 is supplied as described above. Further, to the terminal C thereof, the established values of the weights {ωn}$_k$ are supplied from the weight setting circuit 12 through a line l$_6$. On the other hand, to the terminal B of the circuit 67, a signal indicating the information "H" Level is inputted in case where the above described condition relating to the criterion function that E≦β Emin is satisfied. In case where not satisfied, a signal indicating the information "L" Level is inputted to the terminal B thereof. This amplification factor setting circuit 29 may be composed of a comparator and constructed in such a manner to output a signal indicating "H" Level only when the values indicated by the signals at the terminal A and B are significant and that of the signal at the terminal C indicates "H" and to output another signal indicating "L" Level in the other cases. The output signal of the amplification factor setting circuit 29 is supplied to the terminal C of the data selector. The input signal {εn'} to the terminal A of the data selector 61 is selected and outputted form the terminal D thereof in case where the level of this input signal to the terminal C is "H" Level. In contrast, a potential of 0 is selected and the signal inputted to the terminal B thereof representing the potential of 0 is outputted from the terminal D in case where the level of this input signal to the terminal C is "L" Level.

Further, in the foregoing third embodiment of the present invention, the square of the waveform distortion signal is used as the criterion function. Similarly, the criterion function is not limited thereto. The same effects can be obtained by using, for instance, an absolute value of the waveform distortion function as a criterion function given by the following equation $E = \Sigma_{n=1}^{Ne} |\epsilon n| / Ne.$ Furthermore, the reference signal to be used for detection of the waveform distortion is not limited to the signal having the pulse-like waveform established in the center of the horizontal scanning interval as shown in FIG. 5 (A). For instance, pulse signals extracted by some waveform conversion such as a trailing edge or falling edge of the waveform of the signal for displaying a bar as shown in FIG. 5 (K), a waveform obtained by differentiating a leading edge portion of the vertical synchronization signal and so on can be available as the reference signal to be used in algorithm for cancelling a ghost which is employed in the second embodiment of the present invention.

Figure 13:
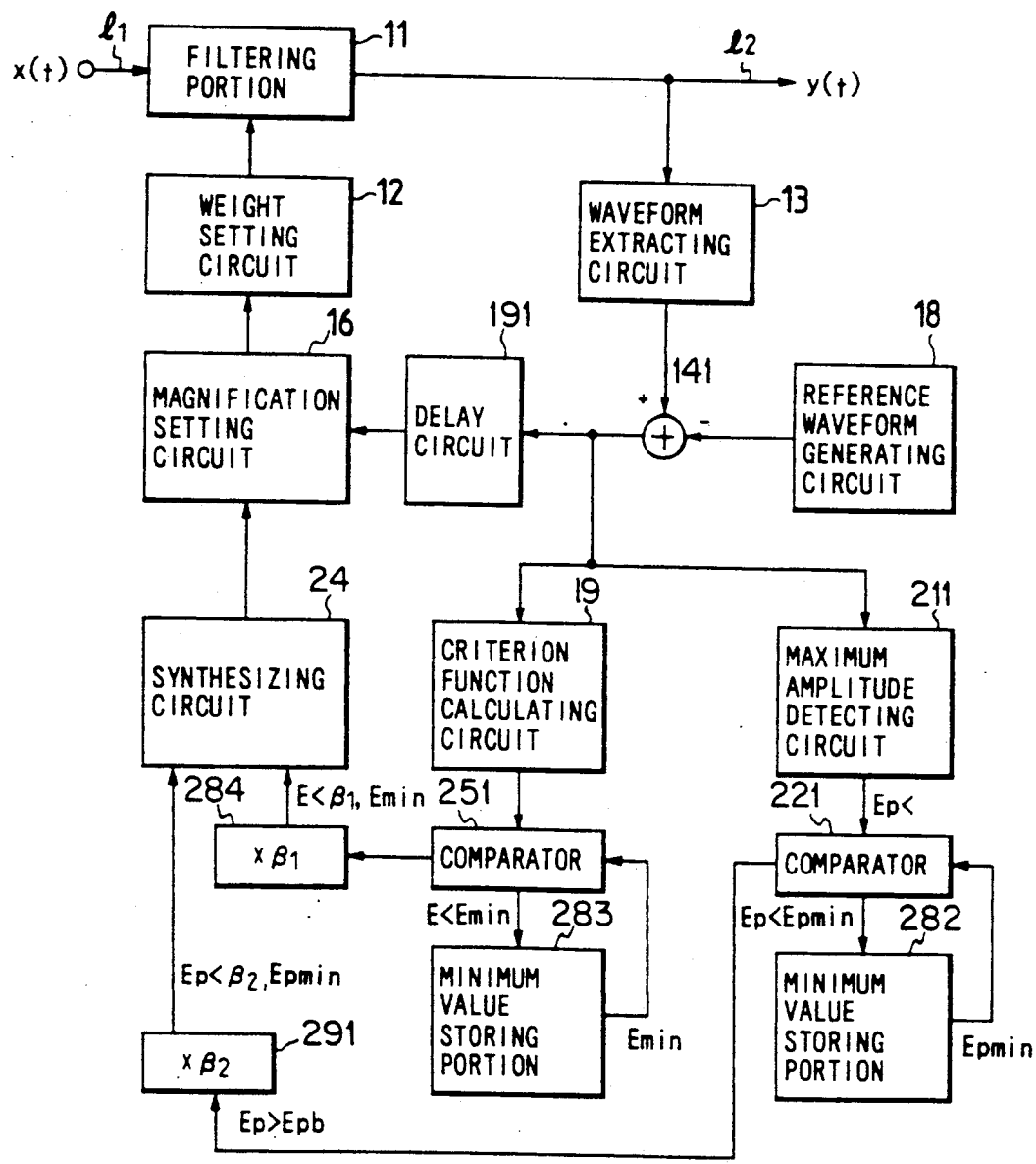
FIG. 13 is a schematic block diagram for showing the configuration of a fourth ghost canceller of the present invention.

Next, a further preferred embodiment, that is, a fourth embodiment of the present invention will be described hereinbelow by referring to FIG. 13. In this figure, like reference characters refer to like or corresponding portions of the prior art devices shown in FIG. 2 (B). Thus, the detail descriptions of such portions of the fourth embodiment will be also omitted. As can be easily understood from a comparison between FIGS. 13 and 2 (B), in addition to circuits provided in the prior art device, this ghost canceller 10 embodying the present invention is provided with a delay circuit 19, a maximum amplitude detecting circuit 211, comparators 221 and 251, a minimum value storing portion 282 and 283, a criterion function calculating circuit 19 and a synthesizing circuit 24 which are inserted and connected between a subtractor 141 and a magnification setting circuit 16. By varying a weighting data setting magnification, the ghost canceller of FIG. 13 can force the weights to converge to values required to cancel a ghost and thereby can cancel the ghost.

Next, by referring to FIG. 13, an operation of this ghost canceller 10 will be described hereunder. Input digital video signal supplied from an input line $l_1$ is fed to a waveform extracting circuit 13 whereupon a portion of the input video signal corresponding to a predetermined interval (for example, a horizontal scanning interval) including a reference signal is supplied to the subtracter 141. In the waveform extracting circuit 13, the conversion (for example, differentiation) of the waveform is performed on the basis of the reference waveform inputted thereinto. Further, in the subtracter 141, the waveform of an internal reference waveform signal sent from the reference waveform generating circuit 18 is compared with that of the reference waveform taken into the wave extracting circuit 13 and thereby an error signal is obtained. This error signal is supplied through a delay circuit 191, which comprises a memory circuit and compensates a delay by starting reading of such a memory circuit at the time of termination of the calculation of the criterion function, to a magnification setting circuit 16 and further is supplied to both of the maximum amplitude detecting circuit 21 and the criterion function calculating circuit 19 which comprises a feedback type integrator operating only during a measurement period and uses one of (or a sum of two or more of) the following criterion functions $E_1$ and $E_2$.

$$E_1 = \int_{t1}^{t2} \epsilon n^2 dt; \text{ or}$$

$$E_1 = \int_{t1}^{t2} |\epsilon(t)| dt.$$

$$E_2 = \int_{t3}^{t4} \epsilon n^2 dt; \text{ or}$$

$$E_2 = \int_{t3}^{t4} |\epsilon(t)| dt$$

where $\epsilon(t)$ represents an error and is equal to the difference between the input waveform s(t) and the reference waveform d(t), that is, $\epsilon(t) = s(t) - d(t)$.

Figure 14:
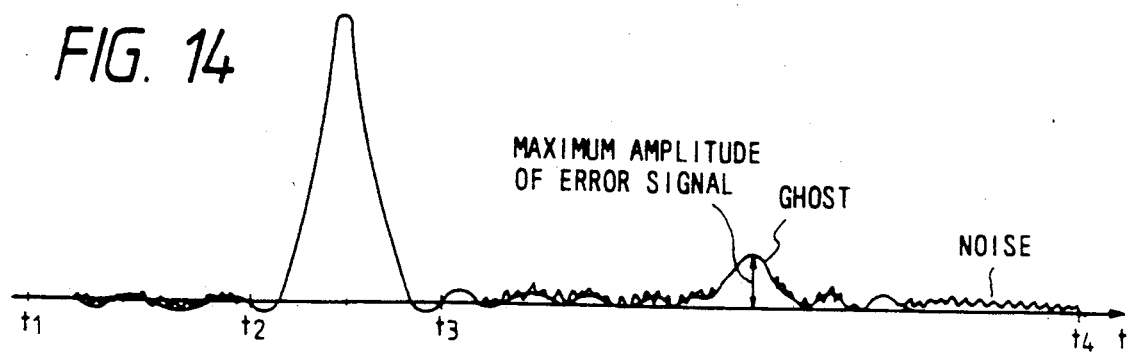
FIG. 14 is a waveform diagram for illustrating the calculation of the criterion function.

FIG. 14 is a diagram for illustrating the calculation of the criterion function. Further, a high level of the signal often appears in the vicinity of the peak of the reference signal (between the times $t_2$ and $t_3$ shown in FIG. 14) regardless of a ghost and a noise and thus in such a region, it is preferable that such a high level is left out of account in calculating the criterion function. Moreover, as to the calculation of the maximum amplitude of the error signal, which is the maximum value of the result of subtraction of the internal reference signal from the signal inputted or taken therein, it is preferable for obtaining the criterion function based on the actual residual ghost that the value of the reference signal in the vicinity of the peak thereof is left out of account.

The maximum amplitude detecting circuit 211 for detecting the maximum amplitude of the error signal may include a comparator, a delay circuit and a maximum value storing circuit which is adapted to operate only during a measurement period. Further, the maximum amplitude obtained therein is stored in the minimum value storing portion 282 by way of the comparator 221 whereupon the value Ep of the amplitude constantly supplied from the maximum amplitude detecting circuit 211 is compared with the minimum value Ep min stored in the minimum value storing portion 282 and then replaces the current value of Ep with that of Ep min only in case where Ep < Ep min and further outputs the minimum value Ep min through a multiplier (or an attenuator) 284 to the synthesizing circuit 24.

On the other hand, the comparator 251 operates as the comparator 221 does and compares the criterion function E constantly supplied from the criterion function calculating circuit 19 with the minimum value Emin stored in the minimum value storing portion 283 and replaces the value of the criterion function E with the minimum value Emin only in case where E < Emin and moreover outputs a signal representing the minimum value Emin through a multiplier (or an attenuator) 291 to the synthesizing circuit 24.

The thus obtained values of the criterion function E and of the maximum amplitude are respectively multiplied by factors $\beta_1$ and $\beta_2$, which are within a constant tolerance, and are then synthesized by the synthesizing circuit 24 and are thereafter supplied to the magnification setting circuit 16 to which the error signal delayed by the delay circuit 191 is supplied. With reference to such an error signal, a magnification for setting a weight is controlled on the basis of an output signal of the synthesizing circuit 24.

For instance, the magnification used for setting the weights of the taps is set as a predetermined value only in case where the values of the criterion function and of the maximum amplitude of the error signal are respectively less than the values obtained by respectively multiplying the minimum values of the criterion function and of the maximum amplitude of the error signal by the factors $\beta_1$ and $\beta_2$. Further, the magnification is set as 0 in the other cases because of the fact that the gains of the taps are set as erroneous values due to a small or inferior S/N. Thereby, the calculated weights are being changed or converged to some values such that a ghost can be cancelled. Thus, the generation of a false ghost in the course of the ghost cancelling processing can be prevented, and a ghost can be effectively cancelled.

Incidentally, these control circuits (that is, the maximum amplitude detecting circuit 211, the comparators 221 and 251 the minimum value storing portion 282 and 283, the criterion function calculating circuit 19 and the synthesizing circuit 24) can be implemented or realized by a read-only memory (ROM) and a several standard logic integrated circuits (ICs).

Further, as can be seen from the foregoing description, the maximum amplitude of the error signal is used as a parameter mainly indicating a residual ghost, and on the other hand the criterion function represents energies of both of a ghost and a noise. Therefore, by observing both of them, a ghost can be observed separately from a noise. Further, by using them as parameters for setting weights, a ghost can be effectively cancelled.

On the basis of the thus determined magnification, a sequence of signals indicating the gains of taps of the filtering portion 11 is determined in the weight setting circuit 12 so as to set the weights of taps of each of the filters. Thereby, a video signal from which a ghost is effectively cancelled is outputted through a line $l_2$. By repeatedly performing the foregoing operations and serially updating the gains of the taps, a ghost and a waveform distortion can be effectively cancelled.

As described above, in this ghost cancelling device, that is, a fourth embodiment of the present invention, the magnification used for setting weights is changed on the basis of both of the criterion function and the maximum amplitude of the error signal, and a ghost cancelling operation is effected by observing both the S/N obtained at the time of detecting a ghost and the state of a residual ghost. Thereby, wasteful setting of the gains of the taps can be prevented. Further, it becomes hard to produce a false ghost. Especially, it has become that a false ghost hardly appears in the course of the ghost cancelling operation. Thus, the calculation required to cancel the false ghost can be saved. Furthermore, by simply adding some circuitry to the configuration of the prior art ghost cancelling device, the cancellation of a ghost can be achieved more smoothly and effectively.

Figure 15:
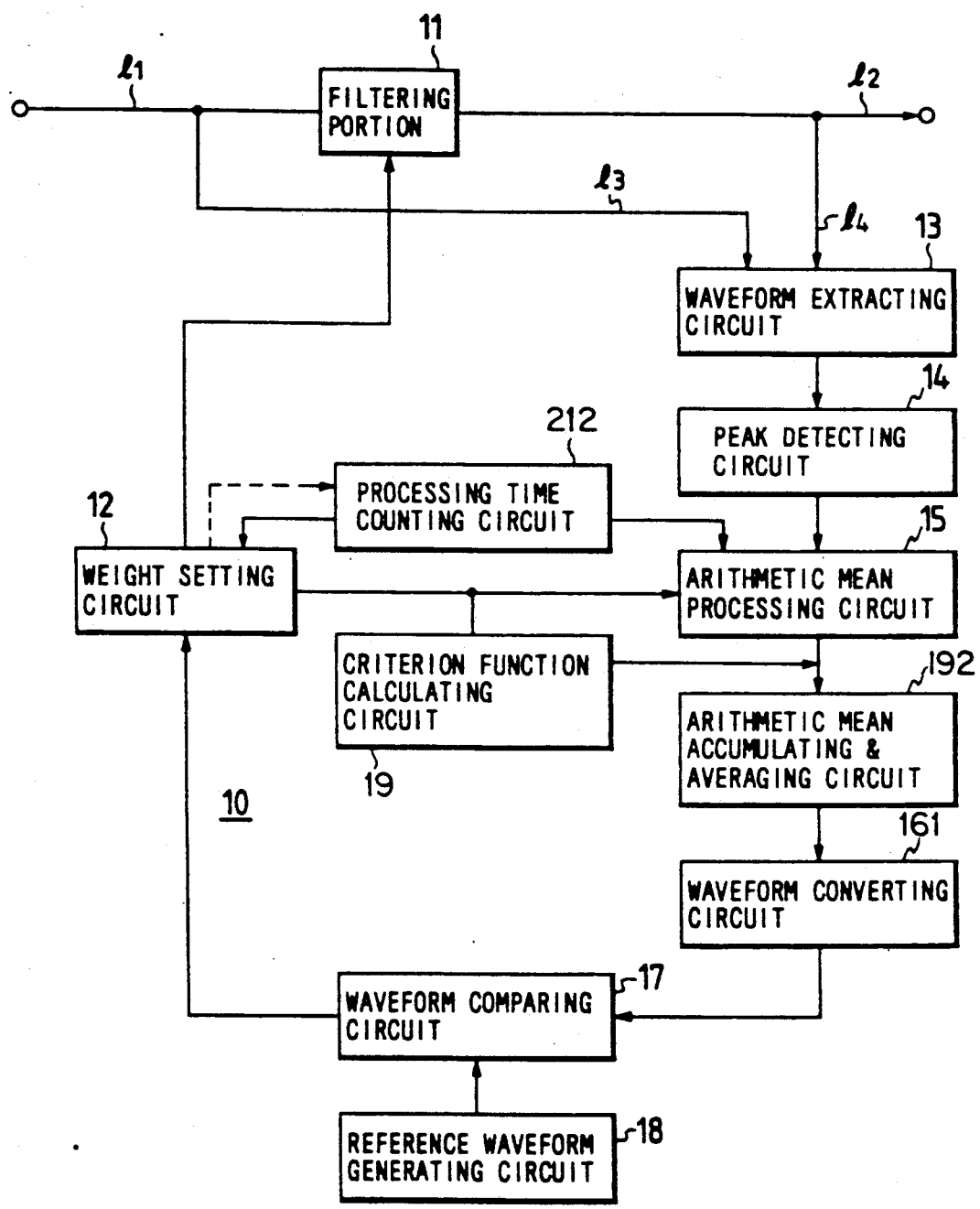
FIG. 15 is a schematic block diagram for showing the configuration of a fifth ghost canceller of the present invention.

Next, a still further preferred embodiment, that is, a fifth embodiment of the present invention will be described hereinbelow by referring to FIG. 15. In this figure, like reference characters refer to like or corresponding portions of the prior art devices shown in FIG. 2 (C). Thus, the detail descriptions of such portions of the fourth embodiment will be also omitted. As can be easily understood from a comparison between FIGS. 13 and 2 (C), in this ghost cancelling device 10 of the present invention, an arithmetic mean accumulating and averaging circuit 192 is interposed between an arithmetic mean processing circuit 15 and a waveform converting circuit 161, and a processing time counting circuit 212 and a criterion function calculating circuit 19 are interposed between the arithmetic mean processing circuit 15 and a weight setting circuit 12, which are connected as shown in FIG. 15. Thereby, the result of every arithmetic mean processing can be accumulated, that is, carried forward to the next arithmetic mean processing. Thus, the greater the times of repeating the arithmetic mean processing, the larger or better the value of S/N of the signal representing the result of the arithmetic mean processing becomes (therefore, the accuracy of the calculation of the weight data can be considerably improved). Furthermore, the times of performing the arithmetic mean processing is changed in accordance with the criterion function calculated on the basis of the times of effecting the ghost cancelling processing and the signal representing the result of the arithmetic mean processing.

For example, at a first time of performing the ghost cancelling processing, the arithmetic mean processing is repeated more than a predetermined number of times to cancel a primary part of a ghost. At each of the second time and later time thereof, the arithmetic mean processing is repeated (that is, the arithmetic mean is accumulated) a smaller number of times to improve S/N and remove finer waveform distortion. Thus, ghosts can be cancelled well smoothly. In addition, a parameter used for the calculation are changed in accordance with the number of times of performing the ghost cancelling processing and the criterion function. That is, if the number of times of performing the arithmetic mean processing is small and the S/N of the signal representing the result of the arithmetic mean processing is also small in an early stage of the total ghost cancelling processing, ghosts can be cancelled visually and smoothly by setting the value of the parameter for the calculation as another value in a later stage such that a false ghost hardly appears.

Next, by referring to FIG. 15, an operation of this ghost canceller 10 will be described hereunder. Input digital video signal supplied from an input line $l_1$ is fed to a waveform extracting circuit 13 whereupon a portion of the input video signal corresponding to a predetermined interval (for example, a horizontal scanning interval) including a reference signal is supplied to a peak detecting circuit 14 whereupon the reference time (corresponding to, for instance, a leading edge or a trailing edge of a step-like reference signal, or corresponding to a peak of a pulse-like reference signal) is detected and effecting a time base correction. After repetition of the operation effected from the waveform extracting circuit 13 to the peak detecting circuit 14, the resulting output of the circuit 14 is supplied to the arithmetic mean processing circuit 15 whereupon the arithmetic mean processing is performed and thus random noises included in the reference signal portion of the input video signal are reduced. At that time, by inputting a count signal generated every updating of a sequence of the gains of taps from the weight setting circuit 12, the number of times of updating the sequence of the gains of the taps is counted by the processing time counter (that is, a circuit for counting the number of times of performing the processing) 212 since the commencement of the ghost cancelling processing. The number of times of performing the arithmetic mean processing is changed in accordance with the number of times of performing the processing indicated by an output signal of this counter 212 and the criterion function calculated by the criterion function calculating circuit 19. Incidentally, the processing time counter 212 is reset at the time of commencement of the ghost cancelling processing.

Hereinafter, the control of the processing is effected in response to change in number of times of the processing as follows. In the first processing, the arithmetic mean processing sufficient to obtain a necessary S/N is effected in order to immediately reduce the primary portion of the ghost. Thereafter, the arithmetic mean accumulating and averaging processing is effected in the arithmetic mean accumulating and averaging circuit 192. Since this is a first time of performing the calculation processing, the result of the arithmetic mean accumulating and averaging processing is the same with that of the arithmetic mean processing effected in the arithmetic mean processing circuit 15. On the basis of the result of the arithmetic mean accumulating and averaging processing, a first setting of the weight data (that is, the first ghost cancelling processing) is performed. In each of the second processing or of the processing later than the second time, the arithmetic mean processing is effected a predetermined constant number of times. The arithmetic mean accumulating and averaging processing is effected on the result of the arithmetic mean processing in the arithmetic mean accumulating and averaging circuit 192. Further, the ghost cancelling processing of the second time or later time is performed on the result of the arithmetic mean accumulating and averaging processing. Thereby, the value of S/N of the signal used for cancelling the ghost is gradually improved or increased. Therefore, the ghost cancelling processing can be performed at higher precision.

Next, the control operation effected on the basis of the criterion function will be described hereunder by referring again to FIG. 14. One or a sum of two or more of a the following criterion functions $E_1$ and $E_2$, is used;

$$E_1 = \int_{t1}^{t2} \epsilon n^2 dt; \text{ or}$$

$$E_1 = \int_{t1}^{t2} |\epsilon(t)| dt,$$

$$E_2 = \int_{t3}^{t4} \epsilon n^2 dt; \text{ or}$$

$$E_2 = \int_{t3}^{t4} |\epsilon(t)| dt$$

where $\epsilon(t)$ represents an error and is equal to the difference between the input waveform s(t) and the reference waveform d(t), that is, $\epsilon(t) = s(t) - d(t)$.

Further, a high level of the signal often appears in the vicinity of the peak of the reference signal (between the times $t_2$ and $t_3$ shown in FIG. 14) substantially without regard to a ghost and a noise and thus in such a region, it is desirable that such a high level is left out of account in calculating the criterion function.

If it is determined on the basis of the result of the calculation that S/N is small or the ghost component is large, the number of times of performing the arithmetic mean processing in the next ghost cancelling processing is controlled in order to cancel a finer ghost component. Moreover, the parameter used for the calculation of the weight data is changed on the basis of the number of times of performing the ghost cancelling processing and the criterion function. That is, in case where it is judged from the criterion function that the value of S/N is small, or in case of the ghost cancelling processing effected in an early stage thereof of which the number of times of performing the ghost cancelling process is small, the parameter (for instance, the magnification used in the weight setting circuit 12) used for the calculation of the weight data is set as a certain value such that a false ghost hardly appears. Thereby, the appearance of a false ghost in the course of the processing can be prevented. Furthermore, the number of times of performing the arithmetic mean accumulating and averaging processing is set in such a manner not to excess a predetermined constant number of times. Therefore, there cannot occur an operation of accumulating the information on the infinite past. Further, it has only to obtain the integral of the arithmetic mean from a certain number of times, which is obtained by reducing a predetermined number of times from the current number of times of performing the ghost cancelling processing, to the the current number of times of performing the ghost cancelling processing with respect to the number of times of performing the ghost cancelling processing. Thereby, this ghost cancelling device of the present invention can cope with a variable ghost and the above described feedback type control.

Figure 16A:
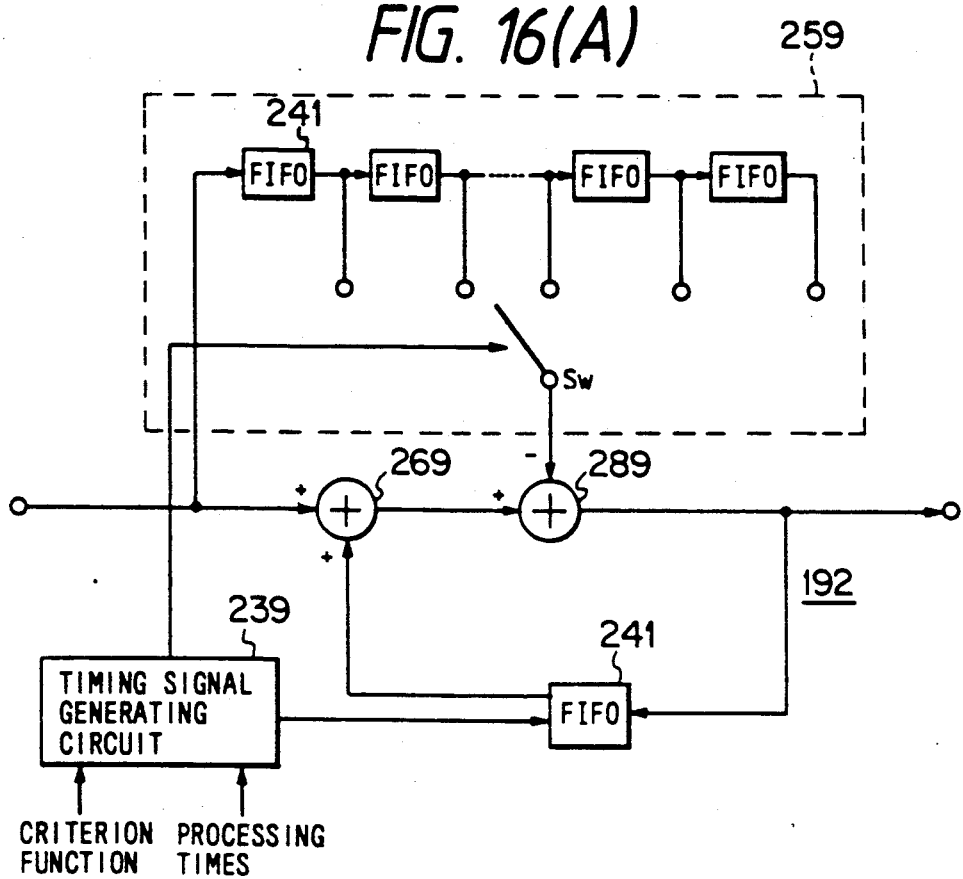
FIG. 16 is a schematic block diagram for showing the construction of an arithmetic mean accumulating and averaging circuit.
Figure 16B:
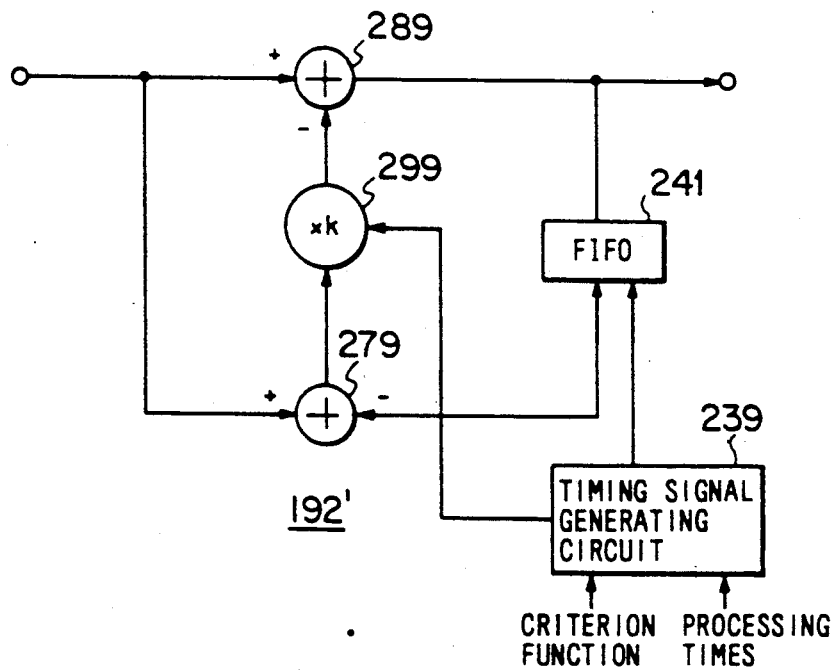
Figure 17:
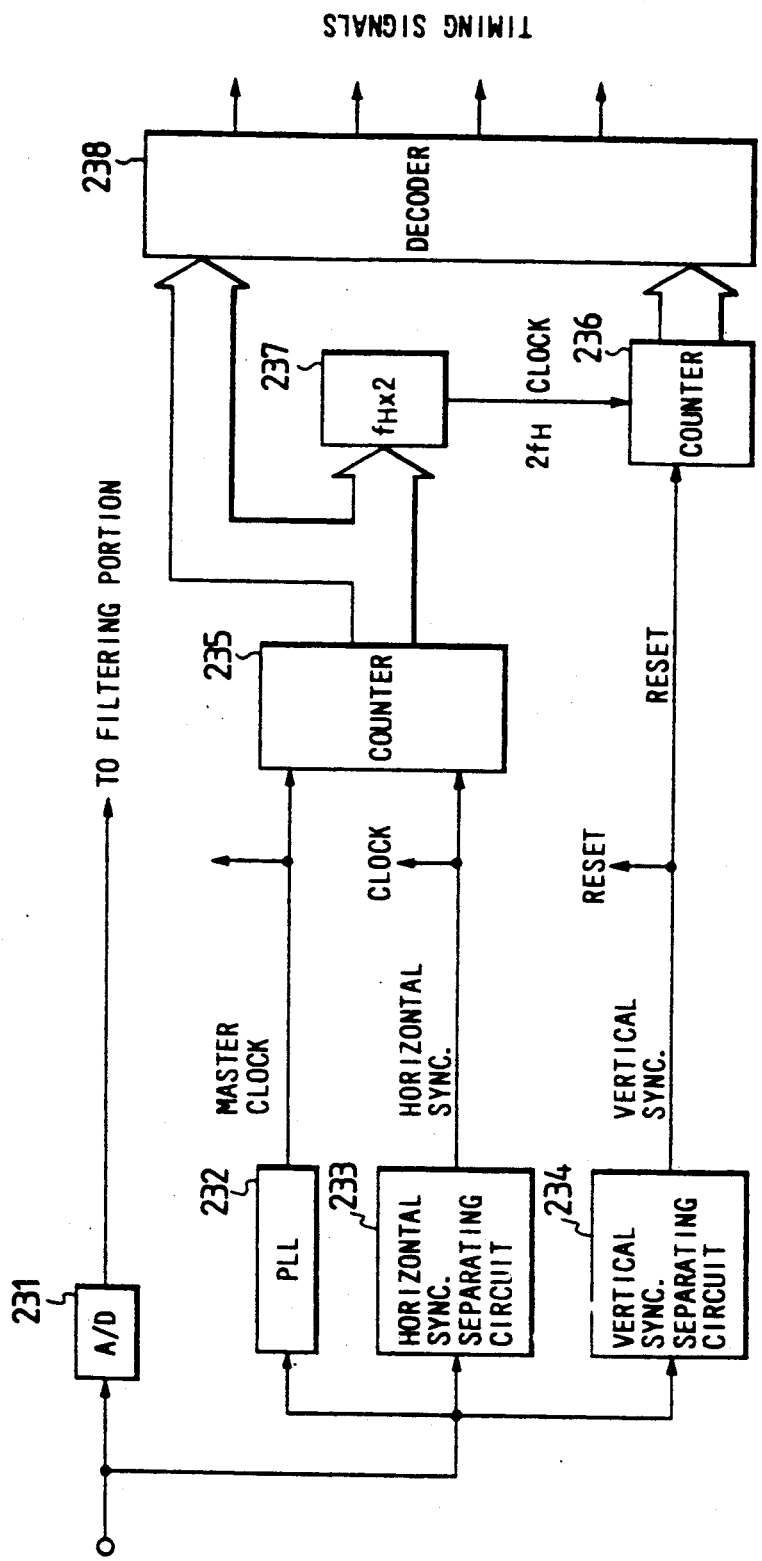
FIG. 17 is a schematic block diagram for showing the construction of a timing signal generating circuit.

Further, a detailed construction of the arithmetic mean accumulating and averaging circuit 192 will be described hereinbelow by referring to FIG. 16 (A) and (B). In these figures, reference numberal 239 denotes a timing signal generating circuit; 241 a first-in first-out (FIFO) type memory, 259 a storing portion including multistages of the FIFO type memories 241, each of which is provided with a tap; 269 an adder; 279 and 289 subtractors; and 299 an attenuator (or a multiplier). Further, in this figure, reference characters Sw indicates a type switching device for effecting a switching operation under the control of a control signal outputted from the timing signal generating circuit 239. Both of the arithmetic mean accumulating and averaging circuit 192 are feedback type filters which are controlled in synchronization with the timing obtained by the timing signal generating circuit 239 in response to the number of times of performing the ghost cancelling processing and to the criterion function in such a manner to change the number of times of the accumulation. Incidentally, the timing signal generating circuit 239 produces a timing signal on the basis of the number of performing the ghost cancelling processing indicated by the signal outputted from the counter 212 and the criterion function indicated by the signal outputted from the criterion function calculating circuit 19. FIG. 17 is a schematic block diagram for showing the construction of the timing signal generating circuit 239. In this figure, reference numeral 231 denotes an analog-to-digital (A/D) converter; 232 burst gating phase locked loop (PLL); 233 a horizontal synchronization signal separating circuit; 234 a vertical synchronization signal separating circuit; 235 and 236 a counter; 237 a frequency multiplier from outputting a signal having a frequency which is two times the frequency of the horizontal synchronization signal; and 238 a decoder. Thereby, the timing signal generating circuit 239 generates various timing signals representing a given timing in a field by decoding horizontal and vertical addresses of a field. Thus, by use of this circuit 239, a given portion (for instance, a portion between times $t_2$ and $t_3$ in FIG. 14) of a signal can be extracted.

Further, the arithmetic mean accumulating and averaging circuit 19 is adapted to perform the arithmetic mean processing of data of n frames by switching the taps of a plurality (n stages) of memories 241 composing the storing portion 259. On the other hand, the arithmetic mean accumulating and averaging circuit 192 is a feedback type filter and can control the number of times of performing the arithmetic mean accumulating and averaging processing in the equalizing manner by changing a feedback ratio k by the atttenuator 299 under the control of the control signal outputted form the timing signal generating circuit 239.

The signal thus taken thereinto of which the waveform is converted (by performing, for instance, differentiation) in the waveform converting circuit 161, which may be a differentiating circuit, in response to the reference signal and is outputted to a waveform comparing circuit 17 whereupon the waveform of the inherent reference signal (the internal reference signal) preliminarily calculated in a reference waveform generating circuit 18 is compared with that of the output signal of the waveform converting circuit 161. A sequence of signals indicating the gains of the taps of a filtering portion 11 is determined by converting the waveform of the output of the waveform comparing circuit 17 in the weight setting circuit 12. As stated above, the parameters such as the magnification are changed therein on the basis of both of the number of times of performing the ghost cancelling processing and the criterion function. The sequence of the signals representing the thus corrected gains of the taps is supplied to the filtering portion 11 and further the video signals, from which a ghost and waveform distortion are removed well, are outputted through a line $l_2$.

Further, as described above, there are two type of the control. That is, one of them is a feedback type control in which the gains of the taps are serially updated by performing the extraction of the reference signal from the outputting side of the filtering portion 11. The other is a feedforward type control in which the extraction of the reference signal is performed form the inputting side of the filtering portion 11 and the previously determined gains of the taps are not used in determining the gains of the taps. In case of the feedback type control, the signal representing the result of the ghost cancelling processing is taken in and further the weights are serially updated. Thus, if the number of times of performing the arithmetic mean accumulating and averaging processing is too large, the information obtained prior to the cancellation is utilized for a long time, sometimes resulting in overcompensation. However, by optimizing the number of times of performing the arithmetic mean accumulating and averaging processing and to some extent the previous result of the cancellation is taken into account in calculating the weights, a ghost can be emphasized when the ghost is detected, thereby effectively cancelling a ghost and waveform distortion. In contrast, in case of the feedforward type control, even if the number of times of performing the arithmetic mean accumulating and averaging processing is relatively large, the value of S/N at the time of detecting a ghost can be rather increased and thus a ghost and waveform distortion can be considerably effectively and well cancelled.

As described above, in this ghost cancelling device, that is, a fifth embodiment of the present invention, the arithmetic mean accumulating and averaging processing is performed by changing the number of times of effecting the arithmetic mean processing on the basis of the criterion function calculated from the signal taken therein and the number of times of performing the ghost cancelling processing. Thereby, the value of S/N at the time of detecting a ghost can be increased. Further, by changing the parameter used for setting the weights on the basis of the criterion function and the number of times of performing the ghost cancelling processing, the weights can be established depending on the value of S/N at the time of detecting the ghost. Thus, a false ghost hardly appears in the course of the ghost cancelling operation. Furthermore, by simply adding some circuitry to the configuration of the prior art ghost cancelling device, the cancellation of a ghost can be achieved more smoothly and effectively.

While preferred embodiments of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A ghost cancelling device, comprising:
   means for deriving a digital first signal by converting the waveform of or extracting a signal of a predetermined period of time such as a pulse-like signal to be used for detecting a ghost;
   means for detecting the position in the time axis of a peak of the first signal and generating a signal having a reference waveform at the time corresponding to the detected position in time-base of the peak;
   a subtracting means for obtaining a second signal by inputting the first signal and the signal having the reference waveform and subtracting the signal having the reference waveform from the first signal;
   a variable amplifier for controlling the value of the second signal data;
   means for obtaining a criterion function by calculating mean square value of the second signal data or averaging the sum of absolute values of the second signal data;
   an amplification factor setting means for setting an amplification factor corresponding to the value of the criterion function only in case where the value of the criterion function is less than a value obtained by multiplying a predetermined factor greater than 1 and a minimum value of the criterion function obtained prior to a predetermined time; and
   means for setting the value of the criterion function as the minimum value of the criterion function only in case where the value of the criterion function is less than the minimum value thereof obtained prior to a predetermined time, wherein a ghost cancelling operation is performed by controlling a gain of a variable amplifier used to control the value of the second signal data by the amplification factor setting means.

2. A ghost cancelling device having a filtering means for removing waveform distortion such as a ghost from television digital video signals, said ghost cancelling device comprising:
   means for deriving a first signal by converting the waveform of or extracting a signal of a predetermined period of time such as a pulse-like reference signal to be used for detecting a ghost;
   means for generating a signal having a reference waveform by adjusting the timing of the generation to the first signal;

a subtracting means for obtaining a second signal by inputting the first signal and the signal having the reference waveform and subtracting the signal having the reference waveform from the first signal;

means for obtaining a criterion function by calculating mean square value of the second signal data or averaging the sum of absolute values of the second signal data;

an arithmetic mean accumulating and averaging means for obtaining a third signal by performing arithmetic mean accumulating and averaging processing of the second signal data;

a synthesizing means for obtaining a fourth signal by adding and synthesizing the second signal and the third signal at a predetermined ratio;

a variable amplifier for controlling the value represented by the fourth signal; and an amplification factor setting means for setting an amplification factor when the value represented by the third signal as well as the weights already established in said filtering means is effective on the basis of the relation between the current value of the criterion function and the minimum of the value of the criterion function obtained by that time, wherein the values of the weights to be established in said filtering means are updated by controlling the gain of said variable amplifier for controlling the value represented by the fourth signal by use of said amplification factor setting means.

3. A ghost cancelling device having a filtering means for removing waveform distortion such as a ghost from television digital video signals, said ghost cancelling device comprising:

means for deriving a first signal by converting the waveform of or extracting a signal of a predetermined period of time such as a pulse-like reference signal to be used for detecting a ghost;

means for generating a signal having a reference waveform by adjusting the timing of the generation to the first signal;

a subtracting means for obtaining a second signal by subtracting the signal having the reference waveform from the first signal;

an arithmetic mean accumulating and averaging means for obtaining a third signal by effecting arithmetic mean accumulating and averaging processing of the second signal data;

a synthesizing means for obtaining a fourth signal by adding and synthesizing the second signal and the third signal at an appropriate ratio;

means for obtaining a criterion function by obtaining mean square value or averaging a sum of absolute value of the quantity represented by the fourth signal;

a variable amplifier for controlling the value represented by the fourth signal; and an amplification factor setting means for setting an amplification factor on the basis of the relation between the value of the obtained criterion function and the minimum of the value of the criterion function previously obtained by a predetermined time, wherein the values of the weights to be set in the filtering means are serially updated by controlling the gain of said variable amplifier for controlling the value represented by the fourth signal by use of said amplification factor setting means.

4. A ghost cancelling device having a filtering portion composed of FIR and IIR filters for cancelling a ghost component in an input video signal by setting the gains of taps of said filters, a waveform extracting circuit for extracting a first signal of a predetermined interval, said first signal including a reference signal for detecting a ghost included in digital input video signal, a reference waveform signal generating circuit for generating a reference waveform signal in synchronization with the reference signal extracted from the input video signal, a subtracting circuit for comparing the waveform of the reference signal extracted from the input video signal with that of the reference waveform signal generated by said reference waveform signal generating circuit and outputting an error signal corresponding to the result of the comparison, a magnification setting circuit for setting a magnification in response to the error signal and a weight setting circuit for converting an output signal of said magnification setting circuit into a signal indicating a weighting data and supplying the signal indicating the a weighting data and supplying the signal indicating the weighting data to the filtering portion as a tap gain setting data, said ghost cancelling device further comprising:

a maximum amplitude detecting circuit for detecting a maximum amplitude of an error signal coming from said subtracting circuit;

a first comparator for comparing the maximum amplitude of the error signal detected by said maximum amplitude detecting circuit with a minimum value of the maximum amplitude of the error signal which value is already stored and updating the minimum value of the maximum amplitude of the error signal;

a criterion function calculating circuit for calculating the value of the criterion function on the basis of the error signal;

a second comparator for comparing the criterion function obtained by said criterion function calculating circuit with a minimum value of the criterion function which value is already stored and updating the criterion function; and a synthesizing circuit for respectively multiplying output signals of said first and second comparators by magnifications which are within certain tolerances and then synthesizing the thus modified output signals of said first and second comparators and further supplying the synthesized signal to said magnification setting circuit, wherein at the time of converting the error signal coming from the subtracting signal into weighting data, a conversion parameter is changed by using both of the maximum amplitude of the error signal and the criterion function calculated on the basis of the error signal, whereby a ghost is cancelled.

5. A ghost cancelling device having a filtering portion composed of FIR and IIR filters for cancelling a ghost component in an input digital video signal by setting the gains of taps of said filters, a waveform extracting circuit for extracting a first signal of a predetermined interval, said first signal including a reference signal for detecting a ghost included in the input video signal, a reference waveform signal generating circuit for generating a reference waveform signal in synchronization with the reference signal extracted from the input video signal, a circuit means for detecting a reference edge or pulse of the reference signal extracted from the input vid signal and performing a time axis correction, or performing an arithmetic means processing, the conversion of the waveform such as differentiation thereof or the combination of such kinds of processing, a waveform comparing circuit for comparing the waveform of the reference signal extracted by said circuit means with that of the reference signal obtained by the reference waveform generating circuit and outputting a signal on the basis of the result of the comparison and a weight setting circuit for setting the gains of taps of said filtering portion in response to the output signal of said waveform comparing circuit, said ghost cancelling device comprising:

an arithmetic mean accumulating and averaging circuit for gradually reducing noise component in a portion of a signal of a constant interval including a reference signal by using the value of an arithmetic mean calculated by an arithmetic mean processing circuit a given time by accumulating the value of the arithmetic mean to use the value of the arithmetic mean the next time;

a processing time counting circuit for counting the times of updating of the weights or the gains of taps effected in the weight setting circuit since a ghost cancelling operation is started; and a criterion function calculating circuit for calculating the criterion function on the basis of the waveform taken into said waveform extracting circuit, wherein the times of effecting the arithmetic mean processing and various parameters are automatically changed on the basis of the number of times of updating of the weights or the gains of taps since the commencing of the ghost cancelling operation obtained by said processing time counting circuit and the criterion function obtained by said criterion function calculating circuit so that the times of performing the arithmetic mean processing is reduced in initial stage of the ghost cancelling operation, in which quick processing is required, to immediately advances to the calculation of the weighting data and thereafter the times of effecting the arithmetic mean processing is gradually increased in the succeeding stages of the ghost cancelling operation in order to obtain the weighting data of high precision.

6. Apparatus for substantially eliminating ghosts from an input video signal comprising a filter responsive to the input video signal for deriving an output video signal;

a weight setting circuit for controlling the frequency response of the filter;

means for deriving a control signal for the weight setting circuit for setting the filter frequency response to substantially eliminate the ghosts; the control signal deriving means including:

means responsive to one of the video signals for deriving a first digital signal for extracting a pulse-like signal of a predetermined time period from said one video signal;

means for detecting the position in the time axis of a peak of the first signal and generating a signal having a reference waveform at the time corresponding to the detected position in time-base of the peak;

comparison means for deriving a second signal having a value representing the magnitude of the relative values of the first signal and reference waveform; and means for deriving a third signal representing a criterion function for the presence of a ghost in the input video signal in response to a unipolarity function of the average value of the value of the second signal, the second and third signals controlling the value of the control signal for the weight setting circuit.

7. The apparatus of claim 6 wherein the unipolarity function is proportional to the mean square value of the second signal.

8. The apparatus of claim 6 wherein the unipolarity function is proportional to the average of the absolute value of the second signal.

9. In an apparatus for substantially eliminating ghosts from an input video signal wherein the apparatus includes:

a filter responsive to the input video signal for deriving an output video signal;

a weight setting circuit for controlling the frequency response of the filter;

means for deriving a control signal for the weight setting circuit for setting the filter frequency response to substantially eliminate the ghosts; the control signal deriving means including:

means responsive to one of the video signals for deriving a first digital signal for extracting a pulse-like signal of a predetermined time period from said one video signal;

means for detecting the position in the time axis of a peak of the first signal and generating a signal having a reference waveform at the time corresponding to the detected position in time-base of the peak;

comparison means for deriving a second signal having a value representing the magnitude of the relative values of the first signal and reference waveform;

the improvement comprising: means for deriving a third signal representing a criterion function for the presence of a ghost in the input video signal in response to a unipolarity function of the average value of the value of the second signal, the third signal having an effect on the value of the control signal for the weight setting circuit.

10. The apparatus of claim 9 wherein the unipolarity function is proportional to the mean square value of the second signal.

11. The apparatus of claim 9 wherein the unipolarity function is proportional to the average of the absolute value of the second signal.

* * * * *